United States Patent
Dewalt et al.

(10) Patent No.: US 10,679,307 B2
(45) Date of Patent: Jun. 9, 2020

(54) SYSTEMS AND METHODS FOR OPTIMIZING PROJECT EFFICIENCY

(71) Applicant: Rhumbix, Inc., San Francisco, CA (US)

(72) Inventors: Drew Dewalt, Orinda, CA (US); Zachary Scheel, San Francisco, CA (US); Michael Myers, San Leandro, CA (US); Alex Morisse, Oakland, CA (US)

(73) Assignee: RHUMBIX, INC., San Francisco, CA (US)

( * ) Notice: Subject to any disclaimer, the term of this patent is extended or adjusted under 35 U.S.C. 154(b) by 1113 days.

(21) Appl. No.: 14/971,884

(22) Filed: Dec. 16, 2015

(65) Prior Publication Data

US 2016/0171633 A1 Jun. 16, 2016

Related U.S. Application Data

(60) Provisional application No. 62/092,695, filed on Dec. 16, 2014.

(51) Int. Cl.
*G06Q 50/08* (2012.01)
*G06Q 10/06* (2012.01)

(52) U.S. Cl.
CPC ....... *G06Q 50/08* (2013.01); *G06Q 10/06398* (2013.01); *G06Q 10/063114* (2013.01)

(58) Field of Classification Search
USPC ................................ 705/7.11–7.42
See application file for complete search history.

(56) References Cited

U.S. PATENT DOCUMENTS

| 5,930,741 | A | 7/1999 | Kramer | |
|---|---|---|---|---|
| 8,810,430 | B2 | 8/2014 | Proud | |
| 2002/0072960 | A1* | 6/2002 | Dabbiere | G06Q 10/08 705/28 |
| 2006/0193262 | A1* | 8/2006 | McSheffrey | H04Q 9/00 370/241 |
| 2009/0204471 | A1 | 8/2009 | Elenbaas et al. | |

(Continued)

FOREIGN PATENT DOCUMENTS

WO WO-2016100554 6/2016

OTHER PUBLICATIONS

Teizer, Jochen, "Location tracking and data visualization technology to advance construction ironworkers' education and training in safety and productivity", School of Civil and Environmental Engineering, Georgia Institute of Technology, Automation in Construction vol. 35, pp. 53-68, Apr. 2013 (Year: 2013).*

(Continued)

*Primary Examiner* — Amber A Misiaszek
(74) *Attorney, Agent, or Firm* — Wilson Sonsini Goodrich & Rosati (57) ABSTRACT

Systems and methods of monitoring actions performed by one or more workers on a jobsite are provided herein. The actions can be monitored over time and tagged as worked and unworked time intervals. Interactions between individuals and teams of individuals can be monitored. Efficient processes can be determined for use in current and future projects to maximize efficiency and reduce costs associated with the current and future projects.

20 Claims, 7 Drawing Sheets

(56) References Cited

U.S. PATENT DOCUMENTS

| | | | |
|---|---|---|---|
| 2010/0094687 A1* | 4/2010 | Waggaman, III | G06Q 10/06 705/7.42 |
| 2011/0022443 A1 | 1/2011 | Partridge et al. | |
| 2011/0035247 A1 | 2/2011 | Perry et al. | |
| 2013/0173461 A1 | 7/2013 | Levy | |
| 2013/0290154 A1* | 10/2013 | Cherry | G07C 1/10 705/32 |
| 2017/0224214 A1* | 8/2017 | Saigh | A61B 5/6801 |

OTHER PUBLICATIONS

Trimble, Inc. Trimble Transforming the way the world works. Available at http://www.trimble.com/Industries/construction/index.aspx. Accessed on Nov. 10, 2016.

International search report and written opinion dated Mar. 4, 2016 for PCT/US2015/066165.

\* cited by examiner

//SYSTEMS AND METHODS FOR OPTIMIZING PROJECT EFFICIENCY

CROSS REFERENCE

This application claims the benefit of U.S. Provisional Application No. 62/092,695, filed Dec. 16, 2014, which application is incorporated herein by reference.

BACKGROUND

Construction projects can comprise a plurality of individuals with different specialized skills performing tasks to complete the construction project. The individuals can work on specialized teams, and the specialized teams can interact in both constructive and destructive ways. In some cases, teams or individuals can share space or equipment while performing different tasks on a work site.

SUMMARY

Projects that involve one or more groups of individuals can have sources of inefficiency that may not be obvious to a manager of the one or more groups. Monitoring and analysis of tasks performed by individuals in the group and/or the group as a whole can identify sources of inefficiency that may not be otherwise detectable by the manager. Interactions between different groups working in a space or on a project can be identified from data obtained by monitoring the tasks performed by individuals in the group and of the groups themselves. In some cases, one or more projects can comprise a series of tasks. Data obtained by monitoring the tasks performed by individuals in the group can identify the best way in which to complete individual tasks and which order the tasks should be performed to increase or maximize efficiency of the project.

Provided herein are systems and methods for improving or optimizing efficiency of projects, for example construction projects. The systems and methods analyze data from one or more sensors to identify efficient processes, crew-based metrics, and efficient working relationships between one or more workers and one or more groups. Sensor data can be collected from wearable sensors worn by workers performing tasks to complete the project. The sensor data can be stored and analyzed by a computer system. One or more project managers can monitor and view the sensor data in real-time. Historic sensor data can be used for future or current project management and planning.

An aspect of the invention is directed to a method of monitoring one or more individuals performing one or more processes, the method comprising: collecting sensor data from some of the one or more individuals over a time interval; determining a productive fraction of the time interval the one or more individuals were engaged in a productive task based on the sensor data; calculating, with aid of one or more processors, an efficiency for the one or more individuals as a comparison of the fraction of the time interval to the time interval; and analyzing, with aid of one or more processors, the efficiency calculation to increase efficiency of current and future processes.

Further aspects of the invention provide a non-transitory computer readable medium comprising machine executable code that, upon execution by one or more computer processors, implements a method of monitoring one or more individuals performing one or more processes, the method comprising: collecting sensor data from some of the one or more individuals over a time interval; determining a productive fraction of the time interval the one or more individuals were engaged in a productive task based on the sensor data; calculating, with aid of one or more processors, an efficiency for the one or more individuals as a comparison of the fraction of the time interval to the time interval; and analyzing, with aid of one or more processors, the efficiency calculation to increase efficiency of current and future processes.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Efficiency management systems can comprise one or more groups of individuals that are performing one or more tasks. The systems can comprise interdependencies between the individuals and/or groups of individuals that cannot be observed by a manager. Specific individuals performing the tasks can have different skill sets, and the interaction of the individuals with varying skill sets can influence performance efficiency. Furthermore, when more than one group occupies a space to perform a plurality of tasks, chaotic flows of people and materials can exist that can be unobvious to predict or efficiently manage in real time. Provided herein are systems and methods to monitor motion and activities of individuals performing tasks in an environment. The motion monitoring can be analyzed to optimize efficiency of current and/or future tasks in the environment.

In some cases, the environment can be a construction site and the individuals can be construction workers performing construction tasks. A construction site (e.g., job site or worksite) can be a location where a building, infrastructure component, or object is being built or demolished. A construction site can comprise electrical, fluid, and structural components that can be connected or disconnected to form or demolish a building, infrastructure component, or object. One or more teams of skilled workers can complete tasks concurrently or consecutively on the construction site. The construction workers can connect components to erect a structure, for example, a building, bridge, or other free standing structure. The construction workers can produce infrastructure, for example, roads, power lines, natural gas pipelines, or plumbing lines. The construction workers can connect materials, install materials, or remove materials to at least partially complete a construction project. In some cases the construction worker can operate specialized and/or power machinery to perform a construction task. For example, such machinery can include a crane, bulldozer, backhoe, forklift, or power tools. The teams of skilled workers can be managed by a contractor, subcontractor, manager, superintendent, crew chief or foreman. In some cases, the workers can perform tasks that are physically strenuous and/or dangerous.

Figure 1:
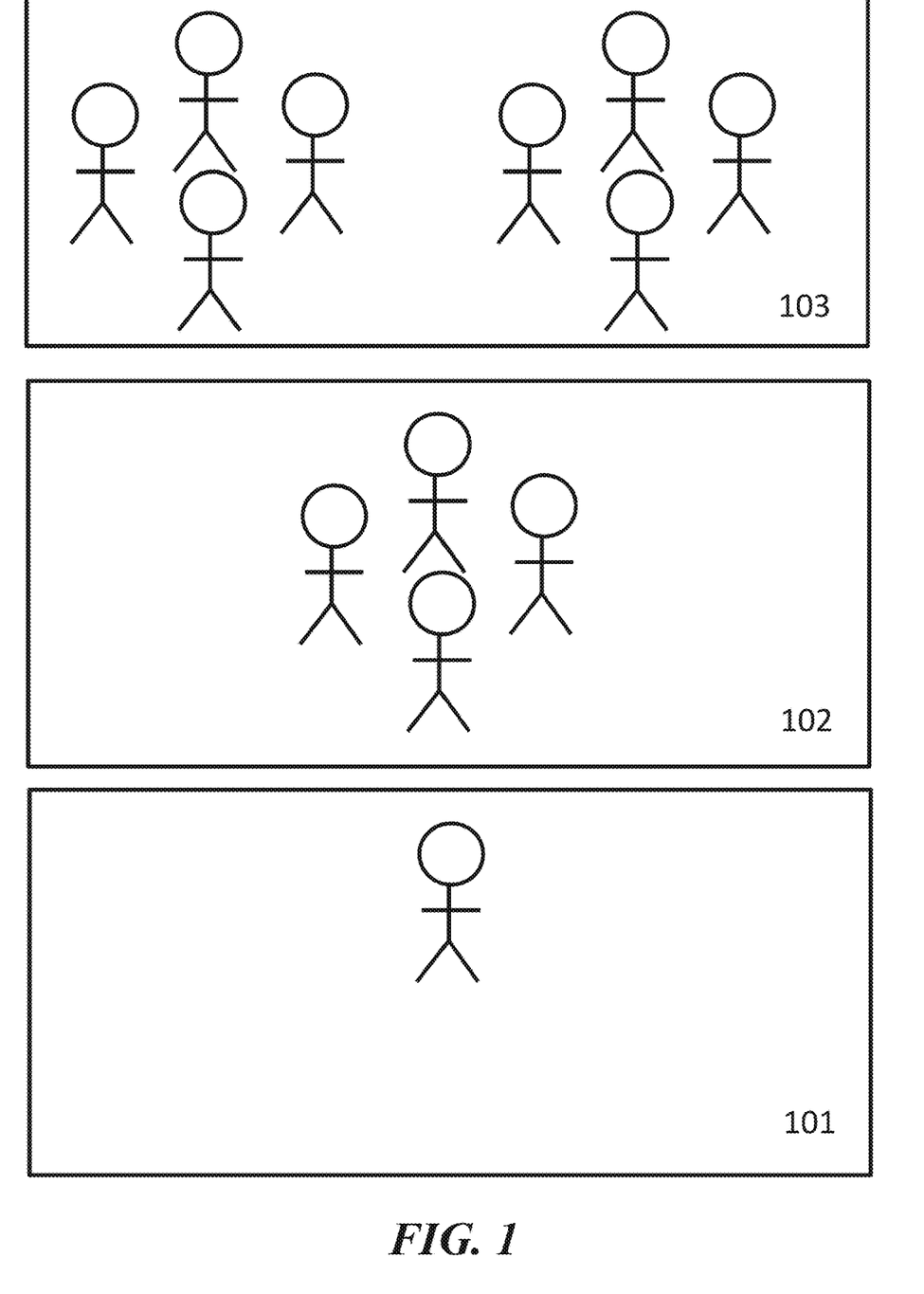
FIG. 1 shows different levels of analysis that can be performed including individual, group, and group to group interaction.

Provided herein are systems and methods for monitoring and optimizing work flow efficiency of one or more work teams on a jobsite. The outputs from the monitoring and optimization can be used by managers to assign tasks, build teams, organize process flows, monitor completion, review work completed, review safety incidents, and make projections for future projects. The work flow can be monitored by collection and analysis of data generated by one or more sensors worn by workers at the jobsite. The work flow can be monitored at one or more levels. FIG. 1 shows a diagram depicting the different levels at which the work flow can be monitored. In some cases, the work of a single individual 101 can be monitored. One or more individuals can be monitored concurrently. In some cases, a team of workers 102 can be monitored. A team of workers can be one or more individuals that complete a series of one or more tasks to complete a job. A work team can comprise a set of individuals with related skills or a set of individual with complementary skills. For example, a work team can be a group of electricians, plumbers, builders, or a diverse group of worker with different skill sets. A work team can be a group of individuals managed by a single contractor or foreman. The work flow of an entire team of workers can be monitored and each worker can be anonymous such that the work of an individual worker on the work team is not distinguishable from another individual on the work team. Alternatively work of different individuals on the work team can be transparent and individually identifiable. In some cases, work flow between one or more work teams 103 can be recorded and analyzed. The one or more work teams can work on different aspects of one project. The team can work at a particular location or region of the worksite or on a particular task or sub-project. The different aspects of the project can be complementary aspects of a single project or a plurality of projects.

Each worker in a work team can generate a sensor data stream in real time. The sensor data stream can be generated from one or more sensors worn by the worker. The sensors can be provided on a wearable electronic device. A wearable electronic device can be a bracelet, watch, arm band, strap, necklace, glasses, hat, hardhat, safety vest, wrist band, ankle band, shoe or boot, socks, chest band, shirt, pants, head band, leg band, skin patch, earbud, or imbedded in the skin of a worker. Alternatively, the wearable electronic device can be a device sized and configured to be placed in a pocket or pouch on a piece of clothing worn by a worker. In some cases, the wearable electronic device can be a smartphone, pager, or tablet.

The worker can wear one or more sensors while working. The wearable electronic device can comprise sensors configured to detect movement, motion and/or location of a worker while performing a task. In some cases, a worker can wear one or more sensors on two or more body parts. The sensor data can be combined from the sensors on the two or more body parts to increase accuracy when analyzing movement, motion, and/or location of the worker. For instance, a combination of movements of the sensors may be assessed to determine an activity of a worker. In some instances, the activity of the worker may be determined based on a comparison with likely activities to be performed by the worker. A combination of movements or locations of the sensors may be assessed to determine a physical position or motion being made by the worker. The data from the sensors may be checked for any discrepancies and/or may raise any alerts. For instance if a sensor worn by an arm of a worker is in a first room and a sensor worn by a leg of the worker is in another room, there may be some indication of error or that the worker is not wearing the sensors. The wearable electronic device can also comprise sensors configured to detect ambient environmental conditions and/or biometric individual body information. Any description of sensors may apply to any type of sensor. For instance, any description of sensors used to analyze movement motion, and/or location of the worker may apply to sensors configured to detect environmental conditions and/or biometric individual body information. For instance, a first sensor worn by a worker may be used to detect movement of the worker while a second sensor worn by the worker may be used to detect a biometric or physiological condition of the worker. Data from any combination of sensors may be analyzed alone or in conjunction. Data from any combination of sensors may be used to determine a state of the worker, an activity of the worker, a location of the worker, safety considerations associated with the worker, working conditions of the worker, health status of the worker, or any other information associated with the worker.

The one or more sensors can include motion sensors. Motion sensors can comprise an accelerometer, a gyroscope, a pedometer, infra-red (IR) sensor, ultrasonic sensor, LIDAR, visual sensor, magnetometer, and/or any other inertial motion sensors. The sensors can be used to assess a position (e.g., orientation and/or spatial location), or motion (e.g., linear velocity, angular velocity, linear acceleration, angular acceleration) or a worker, or a body part of the worker. The one or more sensors can include location sensors, for example global positioning sensors (GPS) and wireless local area network (WLAN) location sensing. The one or more sensors can include body monitoring sensors to measure physiological parameters, for example a heart rate monitor, blood pressure sensor, sweat monitor, blood composition monitor and/or thermometer. The one or more sensors can include ambient conditions sensors to measure environmental parameters, for example a temperature, humidity, and barometric pressure.

Figure 2:
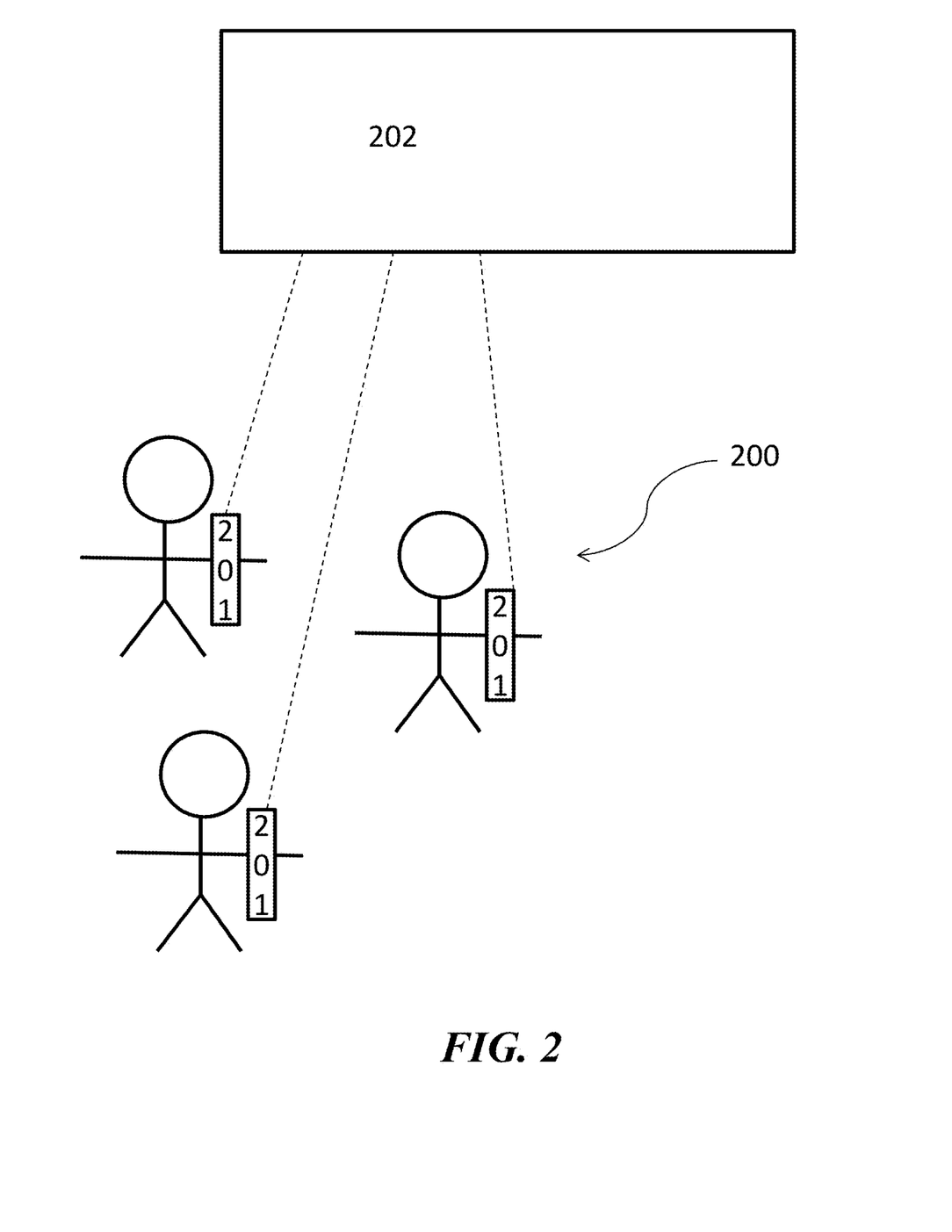
FIG. 2 shows a group of individuals wearing electronic devices with sensors communicating with a computer system.

The data stream can comprise a time history corresponding to a time that each data point in the data stream is generated. The data stream can comprise location and movement data collected by one or more sensors worn by each worker. FIG. 2 shows a group of workers 200 wearing electronic devices 201. The electronic devices 201 can transmit sensor data to a computer system 202. The electronic devices 201 can transmit sensor data to a computer system continuously, at discrete intervals, and/or whenever movement is detected by one or more of the sensors. In some cases the sensors can transmit data to the computer system when they are within a predetermined area, the area can be defined by a geofence or a geographic radius about a point. The area can have any shape. The sensors may or may not transmit data when outside the predetermined area. In some cases the predetermined area can comprise the worksite. The worksite can have internal geofences that define different task or workforce regions. For example, a region on the worksite can be labeled as an active or inactive work area. In some cases, different regions of the worksite can be labeled with different work teams, for example a construction area or a demolition area. In other cases, different regions of the worksite can be labeled with different work zones associated with building elements, for example grade beam or retaining wall. In still other cases, different regions of the worksite can be labeled with different work processes, for example trenching or placing concrete. The sensors may transmit information when within selected work areas. The sensors may or may not transmit information when outside selected work areas.

The sensor data can correspond to work site activities. A movement detected by the one or more sensors can correspond to a specific action. An action can be movement of a body part or parts of the worker to which the sensors are attached. The sensor data can describe the direction, speed, and/or acceleration with which a body part is moved to perform an action. The sensor data can describe the action as a repeated or single action. The sensor data can detect translation and rotation of a body part. In some cases, the sensor data can indicate that a worker is holding or operating a tool or machine while performing the action. For example, a movement detected by the one or more sensors can indicate swinging of a hammer or moving of a material. The movement or action may be correlated with one or more tasks to be performed by the worker.

In some instances, the sensor data may be correlated with information stored in memory, that may be indicative of an action or task being performed by a worker. For instance, a library or database may be provided storing information about how sensor data may be interpreted. The correlation may depend on one or more physical characteristic of the user or demographics of the worker. In some instances, the correlation may depend on prior data collected for the worker. For instance, calibration steps may occur. In one example, data of a known action of a worker (e.g., swinging of a hammer) may be recorded and/or analyzed. Future actions of the worker may be compared with the known actions of the worker.

Data from the sensors that are not movement sensors can be combined with the movement sensor data to assign an action to the movement sensor data or be used on its own. For example, movement data can correspond to picking up an object and data from a heart rate sensor can indicate that the heart rate of the worker increased above a threshold value while performing the movement. The elevated heart rate can indicate that the object was heavy. Similarly, geolocation data can be used to determine the location of the worker in the context of the worksite. A map of the worksite can be known from a building plan, a blueprint for the worksite, or an electronic building information model (BIM) for example. Data from one or more location sensors on the electronic device can be used to determine the location of the worker in the worksite relative to the known worksite map or the geography in general. In an example, movement data can correspond to picking up an object and data from a location sensor can indicate that the worker was near a pile of steel bars on the worksite. The detected proximity to steel bars can indicate that the object picked up by the worker was a steel bar.

Additionally, the one or more sensors can provide a time stamp for each movement and/or location data point. The time stamp can be provided by a local clock or time keeper on the electronic device. Alternatively a computer system that receives sensor data from the electronic device can have a clock that can assign a time stamp to the sensor data. The time stamp can be used to determine when specifically an action begins and ends and for how long an action is performed. The time stamp can be combined with the motion and location data to determine how long a worker spends performing productive and unproductive activities as well as specific and non-specific activities.

The one or more wearable sensors can communicate sensor data to a processor programmed to determine if the sensor data indicates worked or non-worked actions and specific or non-specific activities. Data can be collected by the one or more sensors at a rate of at least about 1 hertz (Hz), 5 Hz, 10 Hz, 15 Hz, 16 Hz, 17 Hz, 18 Hz, 19 Hz, 20 Hz, 30 Hz, 40 Hz, 50 Hz, 60 Hz, 70 Hz, 80 Hz, 90 Hz, or 100 Hz. In some cases, one or more sensors can collect data at substantially the same rate. Alternatively, one or more sensors can collect data at different rates.

Each sensor or group of sensors can be associated with a set of metadata. The metadata can be specific to a worker wearing the sensor or group of sensors. The metadata can include personal information about a worker, information about the jobsite, and/or general data about typical work activities. The metadata can comprise worker identification, age, gender, weight, handedness, cardiac health, general health history, averages resting heart rate, typical work activities, typical tools used during work, weight of tools used, number of tools used to perform a typical job task, geographic layout of worksite, functional layout of work site, weather conditions, and/or company data.

A data stream generated by a worker can comprise a one or more time stamps, locations, and/or movements sensed by one or more motion sensors. The sensor data can be transmitted to a computer system comprising one or more processors programmed to interpret and/or label the sensor data. The one or more processors can determine that the sensor data corresponds to one or more motions. The sensor data can be labeled with one or more semantic or categorical tags. The sensor data can be labeled as "productive activity" or "unproductive activity". In some cases, the sensor data can be labeled with a more specific task label such as "direct" or "indirect" or "contributory" or "non-contributory." In some cases, the sensor data can be labeled with a specific task, a specific task can be a task performed on the job site. For example, a specific task can be "support tying rebar", "laying pipes", "pouring concrete", "cutting sheet metal", "transporting building materials", "welding", "digging", "grading", "drilling", "hammering", "sawing", "framing", "installing electrical bulks", "installing drywall", "site preparation", "material handling", "reporting", and "cleanup".

In some cases, the one or more processors can assign a probability to a label. The probability can reflect the likelihood that the motion data corresponds to the labeled activity. The probability may be expressed as a percentage or ratio, numerical score, or may fall into one or more qualitative category (e.g., "high", "medium", "low"). In some instances, only a single label and probability may be assigned. Alternatively, multiple possible labels with varying probabilities may be assigned. For example, it may be determined that a motion of a worker is likely 80% that he is swinging a hammer, 15% that he is shaking an object, or 5% that he is removing dust.

Location data and metadata associated with a specific worker can contribute to the assigned probability. For example, if a motion is labeled "laying pipes" the probability that this tag is correct can be higher for a worker on a plumbing team than for a worker on an electrical team. Similarly, if a motion is labeled "laying pipes" the probability that this tag is correct can be higher when the motions is detected near a location where a blueprint or building plan indicates piping should be installed and lower when the motion is detected far from a location where a blueprint or building plan indicates piping should be installed. Similarly, the motion duration can contribute the probability. For example, if an action is labeled "laying pipes" occurs over a given time interval, the probability that this label is correct can be influenced by whether this time interval is within a predetermined time interval that is typically associated with how long it should take a worker or workers to lay pipes.

The sensor data can be used to calculate worked and unworked time. The sensor data can be tracked in real time as it is acquired. When the one or more sensors detect an action associated with a work activity the duration of the work activity can be monitored and recorded as worked time. Similarly, when the one or more sensors detect an action associated with a non-work activity the duration of the non-work activity can be monitored and recorded as unworked time. Work activities can be any activities that contribute to productivity in completing a specified task. In some cases work activities can comprise site preparation, material handling, tool servicing, equipment servicing, and/or materials installation. Work activities can be specific to a task or industry. Non-work activities can be any activities that do not contribute to productivity in completing a specified task. In some cases non-work activities can comprise rest, unnecessary travel, wait time, and/or time spent on personal tasks. In some cases, non-worked activities can be detected during a time period that work activities are expected to occur based on a predetermined input. When a non-worked activity occurs for a duration of time above a predetermined threshold, a delay can be recorded. The delay can be reported to a manager and/or a client. An efficiency can be calculated for a single worker or a group of workers based on the ratio of worked time to total time, total time can comprise the total time a worker spend on the jobsite or the total time that a worker logs on a time card. Efficiency can be calculated from the following equation, $$Efficiency = \frac{Hours\ worked}{Total\ Hours}.$$

Figure 3:
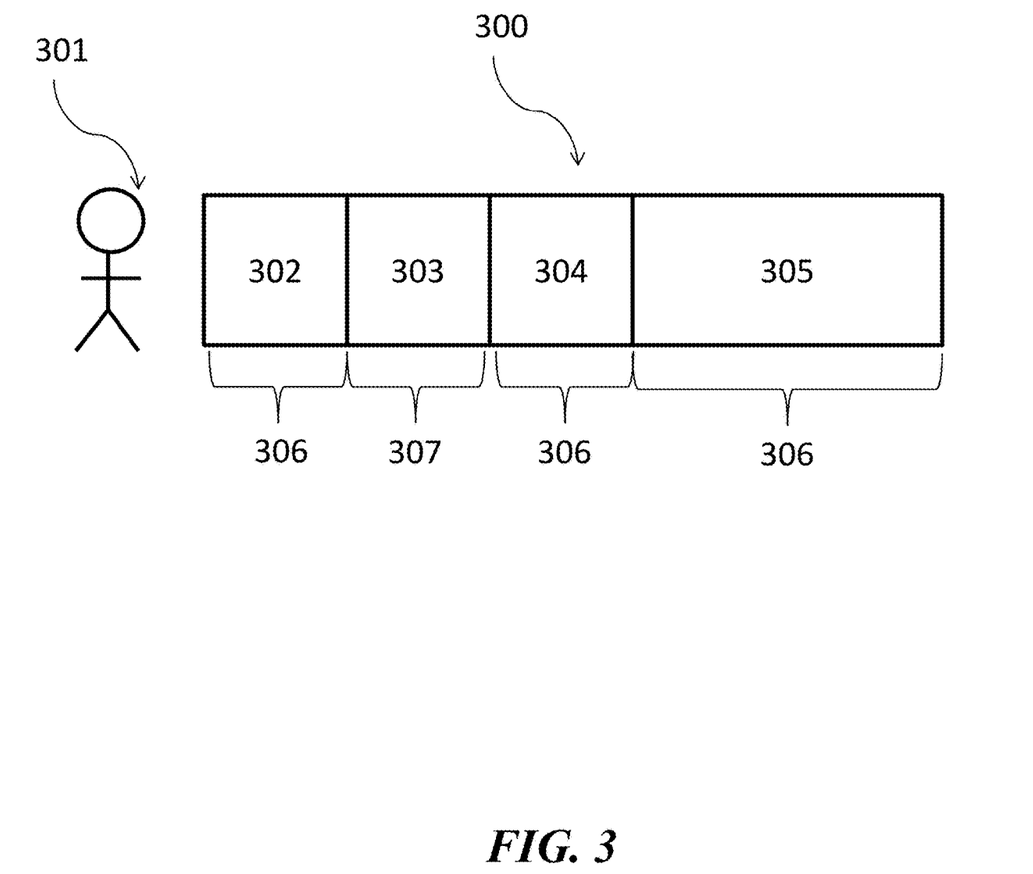
FIG. 3 shows a possible work flow from a worker's electronic device sensors tagged as productive and unproductive tasks as well as specific work motions to complete such tasks.

FIG. 3 shows an example of a data stream 300 that can be generated from sensors on an electronic device worn by a worker 301. The worker can generate sensor data that can be labeled with specific task tags. The task tags can correspond to productive (e.g., work) and unproductive (e.g., non-work) activities. Each task tag can have a time stamp that described the start and end of the task such that a time duration can be assigned to the task tag. The worker can perform tasks 302, 304, and 305. These tasks can be labeled with tags that correspond to productive activities 306. In some cases, productive activities can be activities that contribute to completion of a project. The worker can perform a task 303 that can be labeled as unproductive 307. Unproductive activities can be rest, waiting, meal time, travel or any other activities that do not contribute to completion of a project.

The data stream can be collected and stored for one or more workers and/or one or more work teams. The data stream can be stored on a memory storage device on the wearable electronic device and/or on a memory storage device on an off-board computer system. In some cases the off-board computer system can be a cloud computer system or one or more servers. The data stream can comprise total worked time and unworked time. The worked and unworked time can be stored for each individual worker. The worked and unworked time can be compiled and stored for a team of workers without identifying an individual worker or with identifying workers individually. The total worked time can be analyzed with a productivity measure to determine the efficiency of a worker and/or work team. A productivity measure can be quantified in a standard unit for a specific task. For example, a productivity measure can be linear feet of wire installed, linear feet of piping installed, cubic yards of concrete placed, or tons of structural steel erected in a build structure. Using the sensor data a worker's or group of worker's time spent on a jobsite can be broken up into productive hours and unproductive hours. The productivity for a given time period on the worksite can be calculated as shown below, $$Productivity = \frac{Quantities\ Output}{Productive\ Job\ Hours\ Input},$$

where the productive job hours input is derived from the sensor data and the quantities output is a productivity measure. In some cases, the sensor system and analysis can also determine quantities output. In some cases, one or more clients can be charged only for the productive job hours.

The data collected from the one or more sensors can be collected and analyzed to determine efficient and inefficient workflow scenarios. Efficiency can be calculated as defined above for a single worker, a group of workers, a team of workers, and/or a job site comprising a plurality of teams of workers. In some cases, further analysis can be performed to identify coupling and interdependencies between one or more single workers, one or more groups of workers, and/or one or more teams of workers. The efficiency data can be stored on a memory storage device on the computer system.

The efficiency data can be used and shared between different projects to increase efficiency in future or current projects.

Figure 4:
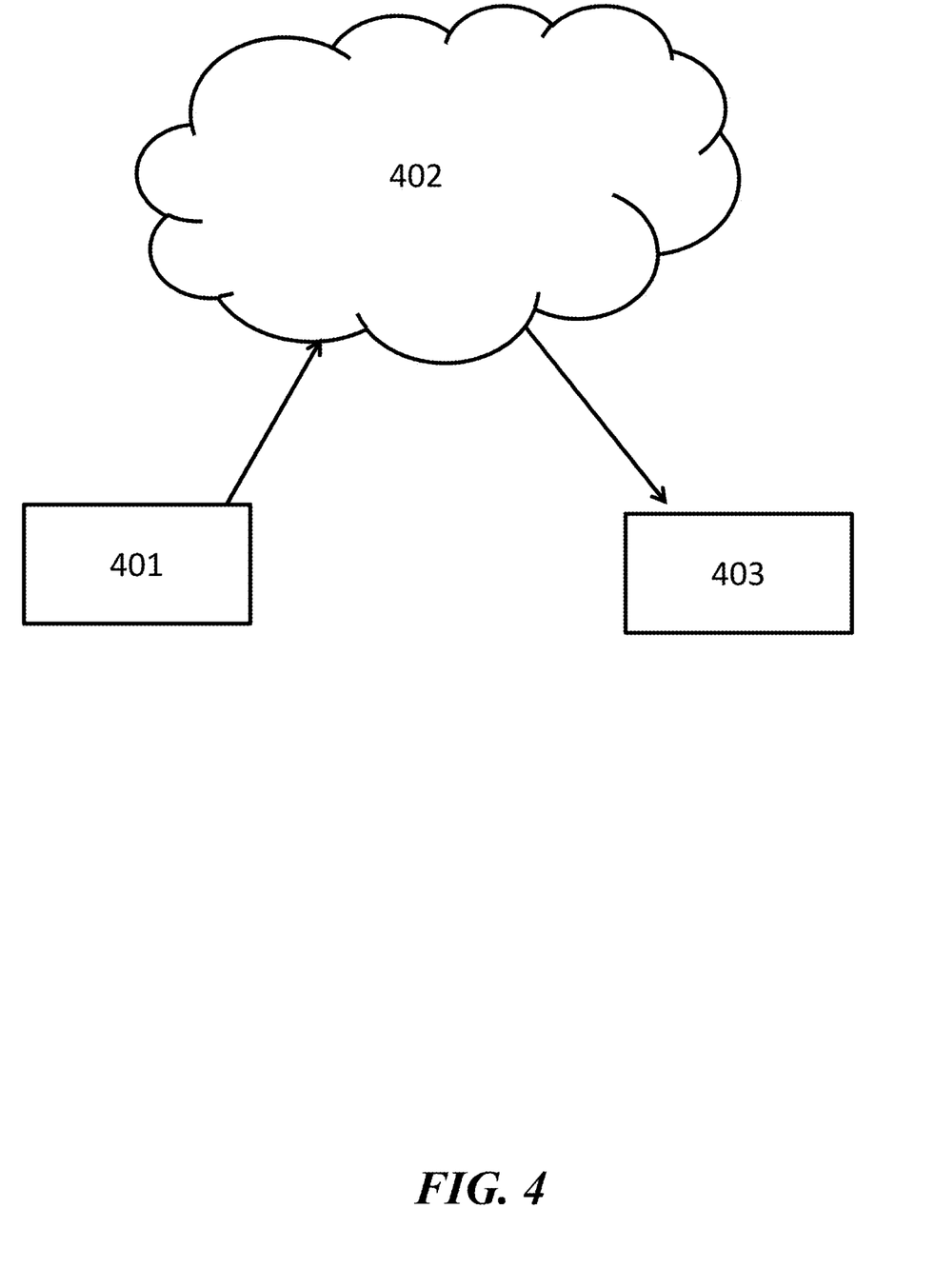
FIG. 4 shows a flow chart of data from one or more sensors to a user device through a computer system.
Figure 5:
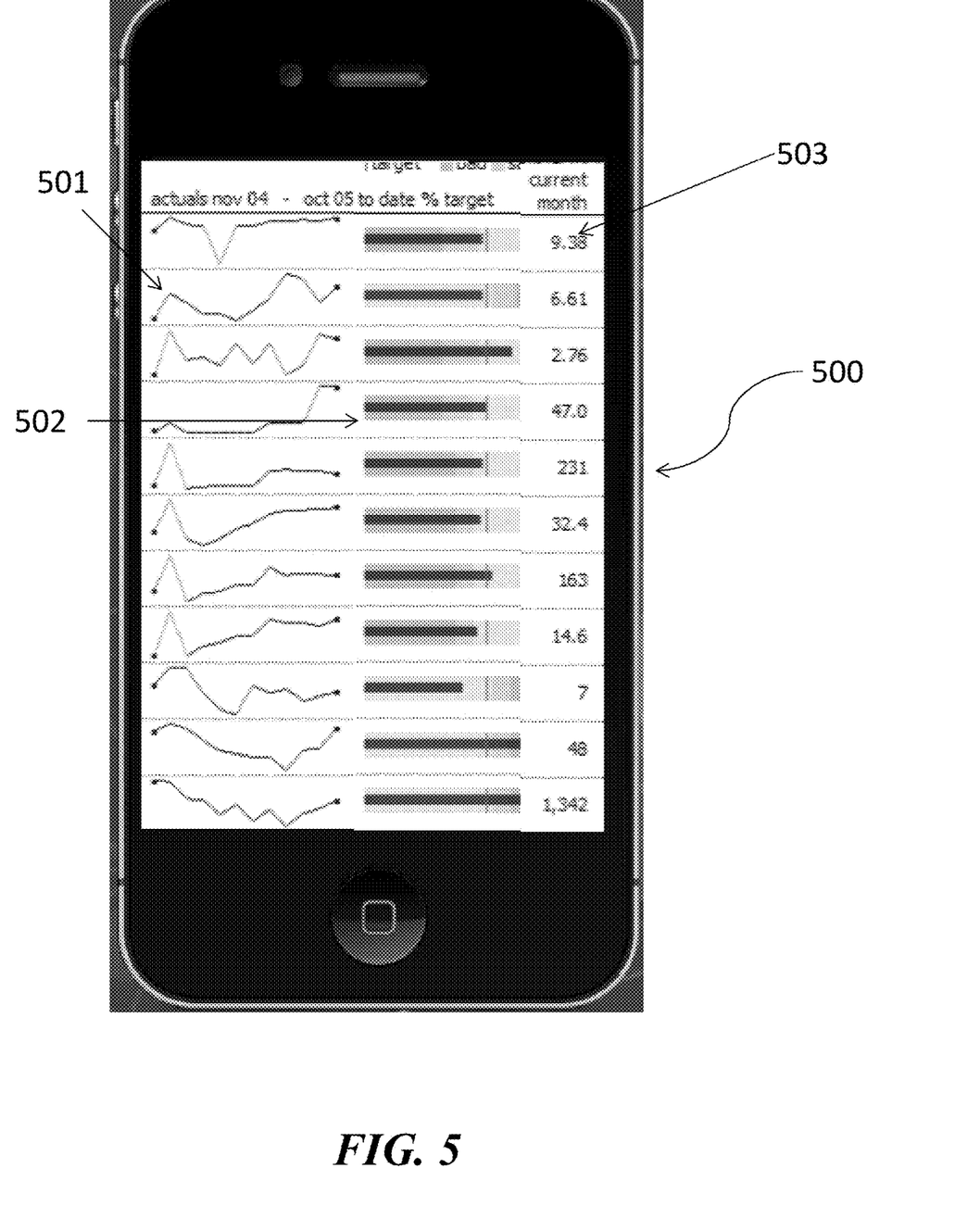
FIG. 5 shows an example of a display that can be provided by a user interface to an individual.

In some cases, a sensor can be in communication with a computer system as shown in FIG. 4. Data from one or more sensors 401 can be transmitted to a computer system 402. The computer system can be a central computer system configured to receive, analyze, and/or store sensor data from one or more workers. The computer system can be a single computer (e.g., server), a cloud computing system (e.g., a plurality of computers or servers). The computer system can be further configured to transmit raw and/or processed sensor data to one or more user devices 403. A user device can be an electronic device in communication with the computer system. A user device 403 can comprise a display, for example, a screen. The display can show a user interface. FIG. 5 shows an example of a user interface 500 that can be provided on by the display. The user interface can show graphical efficiency 501 of one or more workers or teams of workers in real time and/or historically. The user interface can display a meter 502 showing a percentage of a project that has been completed in real time, in some cases the percentage of the project completed can be shown compared to an estimate or quoted time duration. The percentage of a project that has been completed can also be provided numerically 503 on the user interface. A user can receive alerts on the user interface, in some cases the alerts can be textual alerts indicating a delay or drop of efficiency below a predetermined threshold. The user interface can display the location of one or more workers on a map. The map can comprise labels of different geofence regions on the construction site.

In some instances, a user device 403 can be a smartphone, tablet, wearable device, laptop, and/or desktop computer. A jobsite manager can monitor historical and real-time worker efficiency through a program executed on the user interface on the user device via an app or software browser. The user device can alert a jobsite manager of efficient processes, inefficient processes, and ways to increase jobsite efficiency. The program executed on the user device can be compatible with other project management and scheduling tools (e.g., HCSS Construction Software, CMiC Construction Software, eSUB Construction Software, Timberline).

In some cases, a jobsite can have two or more managers that provided oversight to two or more teams working on the jobsite. The two or managers can monitor both the actions and progress of their team as well as the actions and progress of other teams on the jobsite through the user device or separate user devices 403. Using the information about the actions and progress of other teams on the jobsite a manager can develop a strategy for their team that will optimize productivity of their team. For example, a manager can be alerted through a user device that another team on the jobsite is behind schedule on a project. As a result of the other team being behind schedule the manager can update the schedule of their team to avoid conflict or decreased productivity. The user device can be configured to provide a communication channel between managers. In some cases, managers can communicate that help is needed or that a hazard has been detected. The user device can alert a manager with a push notification when a delay, project completion, or danger is detected. The user device can alert managers of near-miss incidents with a push notification. Additionally, the user device can send a push notification from environmental health and safety officials.

The computer system can provide analysis of the sensor data to the user device comprising a user interface that can be in communication with the computer system. The user interface can show raw or processed sensor data from one or more sensors worn by one or more workers in real time. Additionally, the user interface can show a time history of raw or processed data for a given worker or group of workers in a specified time interval. The specified time interval can be a user defined time interval or a preset default. In some instances, the user interface can suggest procedures to maximize efficiency on the work site. The procedures can be based on historical data for a specific worksite or the procedures can be based on pooled historical data from multiple worksites. Historical data from worksites with similar goals and/or conditions can be pooled to determine procedures to maximize efficiency in analogous worksites or in analogous tasks and task groupings. The user interface can suggest process ordering, worker tasking, worker grouping, or inter-worker coordination. For example, a worksite building a bridge can receive suggestions based on data from other historical bridge construction projects that occurred in areas with similar environmental conditions. The computer system can also send alerts to a construction manager when efficiency on the work site falls below a predetermined threshold. In some cases, the computer system can send alerts to the construction manager when a sequence of processes is expected (e.g., has a probability above a predetermined threshold) to cause an inefficiency on the construction site.

The computer system can compile data from one or more construction sites to enhance efficiency analysis. The computer system can match historic sensor data from previous work scenarios with current or future work site to propose or suggest work conditions that will optimize efficiency of the current or future work site. For example, historic sensor data can suggest that efficiency is increased when a first group of specialized workers (e.g., demolition, electrician, or plumber) start work on a project a specified time interval after a second group of specialized workers based on historical sensor data.

Sensor data pertaining to an individual worker can be monitored. The ability to monitor individual workers can increase transparency on a worksite. Sensor data for each worker can be used to verify time-card reporting or replace conventional time cards. A manager can remotely access real-time and/or historical sensor data for a worker through a user device. In some cases, workers can be incentivized to work harder or more consistently because a manager can monitor their work output at any time. Similarly, worker morale and health can be monitored historically and/or in real time. A manager can determine morale and health of workers from the sensor data collected in real-time and/or historical data. Based on the sensor data a manager can design a work schedule for one or more workers to optimize efficiency of a single worker or group of workers. Based on the sensor data, a manager can determine how many hours a worker should work, how often a worker should have a break, and what type of work a worker should perform to optimize jobsite productivity. Such determinations could be made on a day-to-day basis based on the changing personal conditions of individual workers. The user interface can display to a manager values such as efficiency and/or productivity or one or more workers over time. For example, the sensor data can indicate to a manager that efficiency or a worker or team of workers decreases below a predetermined threshold after 4 pm. Based on this information, a manager can choose to end the work day at 4 pm in order eliminate low efficiency work hours.

Interdependencies between workers can be identified by data collected from one or more sensors. Efficiency of a worker can be monitored over time. Location proximity to other workers can be similarly recorded and monitored over time. In some cases, worker efficiency and proximity to other workers can be analyzed to determine which workers work well (e.g., efficiently) together and which workers work poorly (e.g., inefficiently) together. Based on the analysis of worker-worker efficiency a manager can create teams that will work most efficiently together.

In some instances, a jobsite can comprise a first work team and a second work team. The first and second work team can work different projects on the same jobsite. The different projects can be isolated from each other. In some cases, the different projects can be coupled. In an example, a first work team can work on a project that cannot be started until a second team starts their project. In some cases, a first work team and a second work team can share materials or equipment such that they cannot work on the same aspects of different projects concurrently. A first team's project and a second team's project can require the same physical space such that the first team and the second team cannot work at the same time. Coupling between projects of the first work team and projects of the second work team can be unobvious. Coupling between projects of the first work team and projects of the second work team can result in chaotic work flows. The data collected from one or more sensors can be processed to identify favorable and unfavorable coupling between work teams. The data can be analyzed to identify sequences of projects and interactions between the one or more work teams that maximize productivity.

Figure 6:
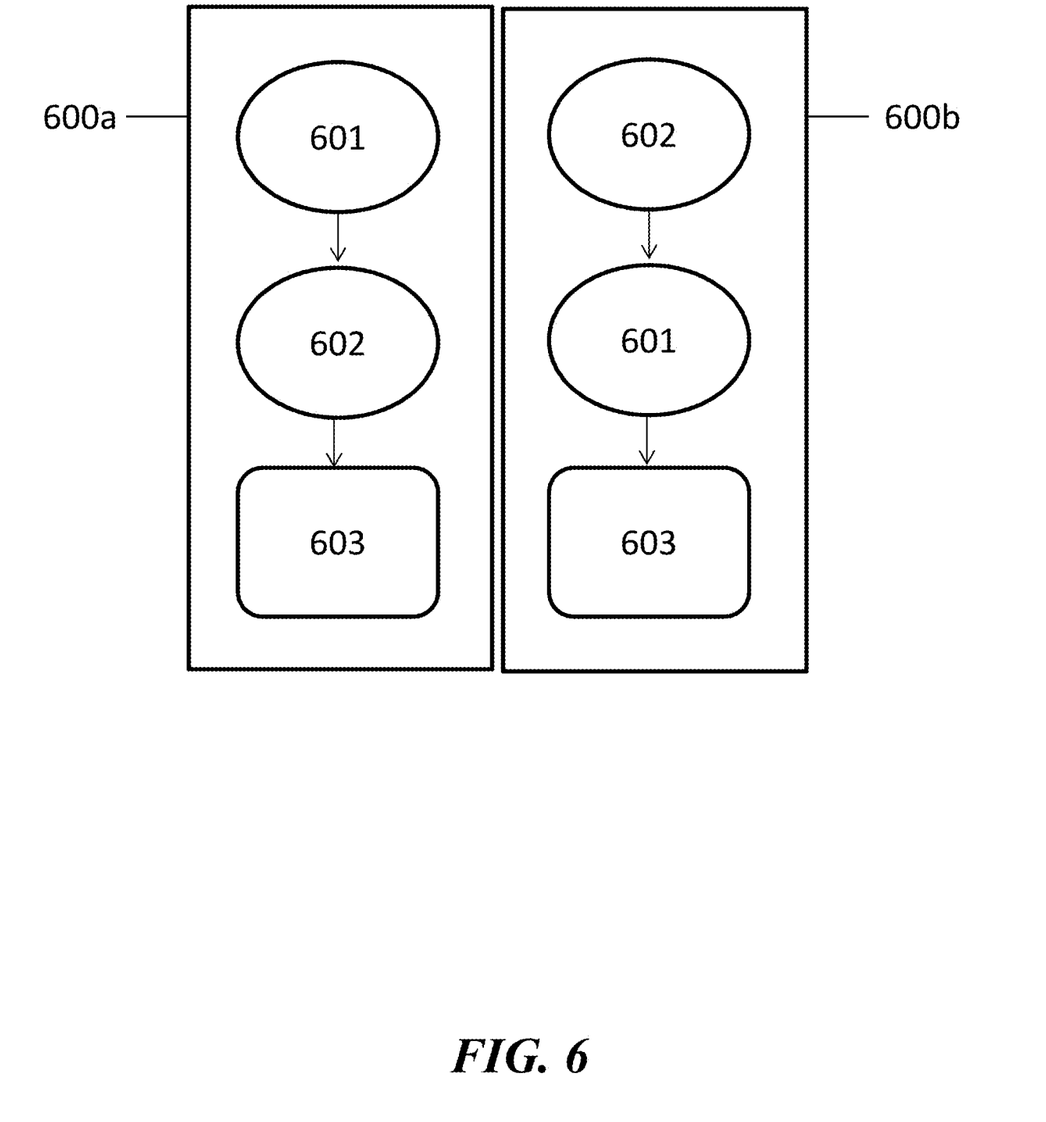
FIG. 6 shows different process orders that can be analyzed to determine a process with optimal efficiency.

Additionally, process efficiency can be maximized by ordering processes, specific tasks or individual motions within a work team or between work teams to maximize efficiency. The system can calculate with the aid of one or more processors connections between process order and efficiency. The user device can display different orders of processes with corresponding predicted efficiency levels as calculated by the one or more processors. Suggestions can be provided to a user based on the calculation to maximize efficiency, productivity, and/or to minimize time needed to complete the process. Historical sensor data from one or more work sites can be analyzed to determine an ordering of one or more processes that will increase efficiency. FIG. 6 shows an example of a series of process flows that can be analyzed to achieve an optimal order that maximizes productivity and/or efficiency. In a first ordering 600a, action 601 can be followed by action 602 to achieve a result 603. In a second ordering 600b, action 602 can be followed by action 601 to achieve a result 603. The efficiency of each ordering can be analyzed to determine the ordering that results in higher efficiency. For example, a job on a work site can comprise cutting sheet metal and moving the sheet metal from a first location to a second location. In a first scenario, a team of workers can cut a piece of sheet metal and then move the sheet metal from the first location to the second location. The team of workers can repeat the process of cutting and then moving until all of the sheet metal is cut to the desired size and moved to the second location. The efficiency of the process order described in the first scenario can be recorded. In a second scenario all of the sheet metal can be cut to a desired size and then all of the sheet metal can be moved from the first location to the second location. The efficiency of the process order described in the second scenario can be recorded. The efficiency of the process described in the first scenario and the efficiency of the process described in the second scenario can be compared to determine which process order results in a higher efficiency process. Future jobs can be designed such that they follow the process order with higher determined efficiency.

The one or more sensors can communicate sensor data to a computer system. The computer system can be on-board a wearable device comprising the one or more sensors. Alternatively, the computer system can be off-board the wearable device. In some cases, the one or more sensors can communicate the sensor data to a cloud computing system. The cloud computing system can comprise one or more processors programmed to analyze the data from the one or more sensors. The sensor data can be used to generate a time history of movement and/or vital information from a worker. The sensor data can be generated by productive and unproductive actions performed by the worker. The one or more computer processors can be programmed to label the actions as productive or unproductive.

The sensor data may be sent to the computer system via a wired or wireless communication. The sensor data may be sent to the computer system in real-time, at periodic intervals, or in the event of a detected event.

In some instances, the one or more processors can be programmed to perform a model analysis to determine whether the sensor data corresponds to productive or unproductive actions. The model can be a statistical model. In some cases the model can calculate a confidence interval (e.g., probability) associated with the productive or unproductive label, the confidence interval can indicate the probability that the action has been labeled correctly. The label can be semantic or categorical tag. The label can be a binary label such as productive or unproductive. Alternatively, the label can correspond to a specific work task. In some cases, the labels can be chosen from a bank of labels that are stored in a memory storage device in the computer system. In some cases, a Bayesian model can be used to label the actions. The Bayesian model can be a Bayesian Hierarchical model (BHM). The BHM can be used to calculate a confidence interval for a label at any level on the work site. For example, the BHM can calculate a confidence interval for a label of actions performed by an individual worker, a team or workers, or a group of teams of workers.

The one or more processors can be programmed to identify an action based on one or more data points from the one or more sensors. The correlation between the action and the one or more data points can be predetermined. Additionally, the processors can be configured to execute a machine learning algorithm to learn new actions and/or to adjust to variance in the motion of specific individuals. For example, an individual can move faster or slower with respect to a predetermined movement for the action, over time the machine learning algorithm can adjust to the faster or slower pace of the individual. In another case, an individual can move more or less with respect to a predetermined movement when performing the action. With repeated uses, the one or more processors can adapt to the motions of a specific user and can more accurately label actions performed by the specific user.

The one or more processors can be programmed to execute a model with two layers. The first layer can extract semantic and/or categorical tags that label the sensor data. One or more distributions can be chosen to represent the sensor data. The distributions can correspond to the probability assigned to each of the labels. The second layer of the model can determine optimal processes, schedules, and/or worker groupings that can optimize efficiency on a project. The model can determine dependencies at small (e.g., worker to worker), intermediate (e.g., within a team), or large (e.g., team to team) scales on the worksite.

They model can have information about the worksite layout and the placement of physical and functional features. In some cases, the model can be integrated with one or more building information modeling (BIM) programs. The BIM can provide the model with information about site specific metrics such as the location of physical features and characteristics at a worksite. Additionally the BIM can have a time domain component that can update in-real time with progress on the worksite. As structures are created or destroyed in the real work site, the structures can be created or destroyed in the BIM. Similarly, materials can appear in the BIM when they are delivered to the work site. Integration of the model and the BIM can allow application of productivity metrics to a specific site such as mass flow, turbulence, and/or optimal process ordering. In some cases, dynamic genetic programming can be used to determine functional dependencies between groups of sensor data.

The model can process the sensor data using signal processing techniques to derive information from the sensor data. In some cases, a Fast Fourier Transform (FFT) can be applied to the sensor data to identify differences between similar motion patterns between one or more workers or between motion patterns from the same worker at different time periods. Each worker can generate a unique FFT analysis while performing a task, the FFT analysis can be used to distinguish motion data from different workers. Alternatively, the FFT analysis can be used to determine worker fatigue. Changes in the FFT analysis of a signal from a worker over time can indicate fine changes in the motion of the worker that can indicate fatigue or overuse of a joint or muscle group.

Differences in the skill level or ability between different workers can be detected by analysis of the sensor data. Suggestions can be provided to managers based on the analysis to assign workers to different types of tasks where they can be used most efficiently. For example, when two workers perform an identical task differences in the efficiency between a first worker performing the task and a second worker performing the task can be identified. In some cases, workers can have different levels of strength, fine motor skills, coordination, cognitive ability, stamina, and/or patience. Differences in ability can increase the efficiency with which a worker can complete a specific task. The sensor data can be analyzed to determine that a first worker with a first set of skills or ability level is more efficient at completing a first set of tasks while a second worker with a second set of skills or ability level is more efficient at completing a second set of tasks. Based on the sensor data workers can be assigned to tasks that they can complete most efficiently and can be unassigned from tasks that they complete less efficiently compared to other workers. For example, a relatively stronger worker can haul heavy building material without taking breaks while a relatively weaker worker can require periodic rest breaks while hauling the heavy building material. The sensor data can show that the relatively stronger worker is able to work more efficiently while hauling the heavy building material compared to the weaker worker. As a result, the stronger worker can be assigned to the tasks that require hauling heavy materials while the weaker worker is assigned to a different task or set of tasks.

The one or more processors can be further programmed to determine one or more action sequences that can optimize efficiency of the work site. An efficiency can be determined for each individual worker at a work site. The efficiency data for each worker can be analyzed relative to other workers to identify worker to worker interactions and dependencies. For example, worker A can have a first efficiency while completing a task with worker B and a second efficiency while completing the same task with worker C. If the first efficiency is greater than the second efficiency the data can indicate that worker A should work with worker B instead of with worker C in order to increase efficiency.

Additionally, the data from the one or more sensors can be interpreted by a model executed by the one or more processors to determine the optimal number of workers that should be assigned to a task in order to optimize costs and task efficiency. Optimization can decrease costs and increase productivity. In some instances, a group of workers can be assigned to a task. More than one worker can be assigned to the task, for example, at least about 2, 3, 4, 5, 6, 7, 8, 9, or 10 workers can be assigned to work collaboratively on a single task. The sensor data can be analyzed to determine if the group of workers is being efficient at performing the task. The sensor data can be analyzed to determine the optimal number of workers assigned to the task. For example, if a group of workers are assigned to the task and the sensor data indicates that at least a fraction of the workers are logging unworked time as indicated by the sensors data while the remaining fraction of workers are logging worked the sensor data can indicate that too many workers have been assigned to the task.

At a higher level, the efficiency of an entire crew of workers can be analyzed with respect to interactions with a second crew of workers. For example, a worksite can have a first group of workers completing a first task and a second task. The first and second task can be coupled such that they share equipment, space, and/or resources. The one or more processors can be programmed to determine a sequence of actions by the first and second crews that will maximize work site efficiency.

Control Systems

Figure 7:
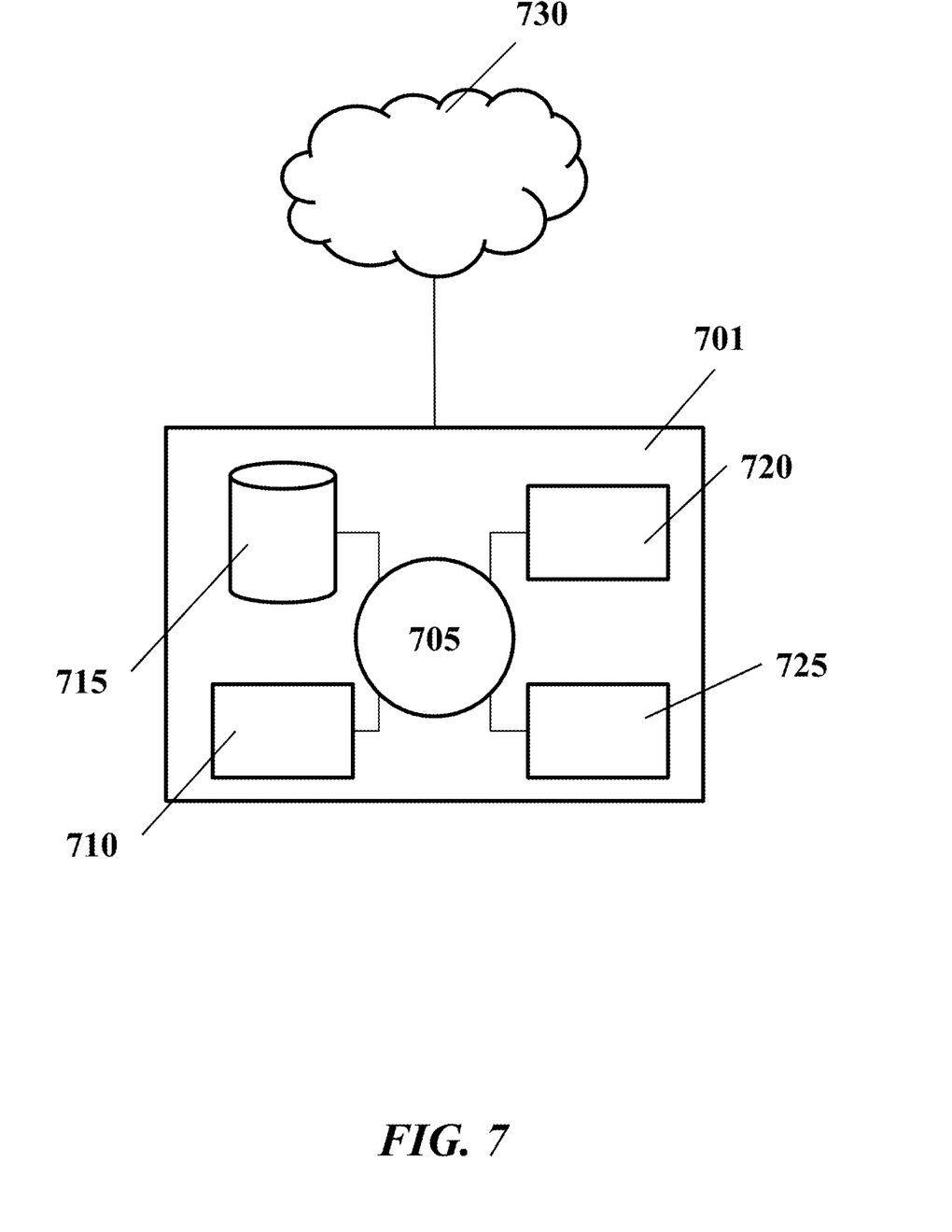
FIG. 7 schematically illustrates a computer system for facilitating analysis of data to generate worksite optimization metrics.

The present disclosure provides computer control systems that are programmed to implement methods of the disclosure. FIG. 7 shows a computer system 701 that is programmed or otherwise configured to collect and analyze sensor data collected from one or more individuals. The sensor data can comprise data pertaining to an individual's location and movement. The sensor data can be collected by one or more sensors worn by the individual. The computer system 701 can determine the work efficiency of an individual based on the sensor data. The computer system 701 can identify processes that result in optimal or increased efficiency and cost savings at a worksite. The computer system 701 can further identify optimal coupling between individual workers or groups of workers.

The computer system 701 includes a central processing unit (CPU, also "processor" and "computer processor" herein) 705, which can be a single core or multi core processor, or a plurality of processors for parallel processing. The computer system 701 also includes memory or memory location 710 (e.g., random-access memory, read-only memory, flash memory), electronic storage unit 715 (e.g., hard disk), communication interface 720 (e.g., network adapter) for communicating with one or more other systems, and peripheral devices 725, such as cache, other memory, data storage and/or electronic display adapters. The memory 710, storage unit 715, interface 720 and peripheral devices 725 are in communication with the CPU 705 through a communication bus (solid lines), such as a motherboard. The storage unit 715 can be a data storage unit (or data repository) for storing data. The computer system 701 can be operatively coupled to a computer network ("network") 730 with the aid of the communication interface 720. The network 730 can be the Internet, an internet and/or extranet, or an intranet and/or extranet that is in communication with the Internet. The network 730 in some cases is a telecommunication and/or data network. The network 730 can include one or more computer servers, which can enable distributed computing, such as cloud computing. The network 730, in some cases with the aid of the computer system 701, can implement a peer-to-peer network, which may enable devices coupled to the computer system 701 to behave as a client or a server.

The CPU 705 can execute a sequence of machine-readable instructions, which can be embodied in a program or software. The instructions may be stored in a memory location, such as the memory 710. Examples of operations performed by the CPU 705 can include fetch, decode, execute, and writeback.

The CPU 705 can be part of a circuit, such as an integrated circuit. One or more other components of the system 701 can be included in the circuit. In some cases, the circuit is an application specific integrated circuit (ASIC).

The storage unit 715 can store files, such as drivers, libraries and saved programs. The storage unit 715 can store user data, e.g., user preferences and user programs. The storage unit 715 can store raw and/or processed historical sensor data. The computer system 701 in some cases can include one or more additional data storage units that are external to the computer system 701, such as located on a remote server that is in communication with the computer system 701 through an intranet or the Internet.

The computer system 701 can communicate with one or more remote computer systems through the network 730. For instance, the computer system 701 can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 701 via the network 730.

Methods as described herein can be implemented by way of machine (e.g., computer processor) executable code stored on an electronic storage location of the computer system 701, such as, for example, on the memory 710 or electronic storage unit 715. The machine executable or machine readable code can be provided in the form of software. During use, the code can be executed by the processor 705. In some cases, the code can be retrieved from the storage unit 715 and stored on the memory 710 for ready access by the processor 705. In some situations, the electronic storage unit 715 can be precluded, and machine-executable instructions are stored on memory 710.

The code can be pre-compiled and configured for use with a machine have a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 701, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 701 can include or be in communication with an electronic display that comprises a user interface (UI) for providing, for example, real-time and/or historical sensor data. The UI can provide raw data and/or processed data from one or more sensors. The UI can comprise a map interface that can show the location of one or more workers in real-time. In some cases, the map interface can show historical locations of one or more workers and/or a historical trajectory of one or more workers. One or more jobsites can be displayed on the UI. Production levels can be displayed on the UI for one or more jobsites. Crews can be compared using the UI. For example, efficiency and/or productivity metrics can be compared for two or more crews at different worksites that are completing similar or identical tasks. Examples of UI's include, without limitation, a graphical user interface (GUI) and web-based user interface.

Methods and systems of the present disclosure can be implemented by way of one or more algorithms. An algorithm can be implemented by way of software upon execution by one or more computer processors. In some examples, an algorithm for labeling one or more sensor data points with a specific task tag comprises executing a machine learning algorithm. In some cases, a statistical model (e.g., hierarchical Bayesian model) can be implemented to label one or more sensor data points with a task tag.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A worksite management system for managing one or more processes performed by individuals at a worksite, the worksite management system comprising:
    a plurality of wearable devices including global position system (GPS) sensor or motion sensor worn by the individuals at the worksite; and
    a sensor control system comprising one or more processors configured to:
    (a) collect sensor data including global position system (GPS) data or motion data from some of the individuals over a time interval, wherein the sensor data are captured by the plurality of wearable devices worn by the individuals;
    (b) identify, using a machine learning algorithm, one or more actions corresponding to worksite activities performed by the individuals based on the sensor data;
    (c) determine a productive fraction of the time interval the individuals were engaged in a productive worksite activity based on the one or more actions;
    (d) calculate, with aid of the one or more processors, an efficiency for the individuals as a comparison of the fraction of the time interval to the time interval;
    (e) analyze, with aid of the one or more processors, the efficiency calculation to determine a coupling and interdependency relationship between one or more individuals, one or more groups of individuals or one or more teams of individuals; and
    (f) generate an alert on a management user interface based on the sensor data of one ore more of the individuals over the time interval via a communication channel that in communication with the sensor control system, wherein the management user interface provides a graphical representation of a suggested regrouping of one or more of the individuals at the worksite based on the coupling and interdependency relationship, thereby increasing the efficiency of current and future processes at the worksite.

2. The worksite management system of claim 1, wherein the plurality of wearable devices are configured to detect movement, motion and location of the individuals.

3. The worksite management system of claim 2, wherein the movement, motion and location of the individuals are analyzed and correlated with a worksite activity associated with a construction project.

4. The worksite management system of claim 3, wherein a probability level is correlated with the worksite activity.

5. The worksite management system of claim 1, wherein the plurality of wearable devices are configured to detect ambient environmental conditions and biometric body information of the individuals.

6. The worksite management system of claim 1, wherein a plurality of sensors are provided on different body parts of an individual and data from the plurality of sensors is combined to increase accuracy of analyzing activity of the individual.

7. The worksite management system of claim 1, wherein the comparison of the fraction of the time interval to the time interval is a ratio between an amount of time encompassed by the productive fraction of the time interval and the time interval.

8. The worksite management system of claim 1, wherein the management user interface further provides a suggestion of an order of performing one or more worksite activities, thereby increasing the efficiency of current and future processes.

9. The worksite management system of claim 8, wherein the alert is delivered to one or more of the plurality of wearable devices to alert the one or more individuals about the regrouping a use of equipment or a location associated with one or more suggested worksite activities.

10. The worksite management system of claim 1, wherein the worksite activities are associated with a construction project.

11. The worksite management system of claim 1, wherein the individuals is a team of workers.

12. The worksite management system of claim 1, wherein the management user interface further displays a graphical representation of the efficiency for the individuals over time.

13. The worksite management system of claim 12, wherein the management user interface further displays a meter showing a percentage of a target for the worksite activities that has been completed.

14. A non-transitory computer readable medium comprising machine executable code that, upon execution by one or more computer processors, implements a method of managing one or more processes performed by individuals at a worksite, the method comprising:
    collecting sensor data including global position system (GPS) data or motion data from some of the individuals over a time interval, wherein the sensor data are captured by a plurality of wearable devices worn by the individuals;
    identifying, using a machine learning algorithm, one or more actions corresponding to worksite activities performed by the individuals based on the sensor data;
    determining a productive fraction of the time interval the one or more individuals were engaged in a productive worksite activity based on the one or more actions;
    calculating, with aid of one or more processors, an efficiency for the individuals as a comparison of the fraction of the time interval to the time interval;

analyzing, with aid of one or more processors, the efficiency calculation to determine a coupling and interdependency relationship between one or more individuals, one or more groups of individuals or one or more teams of individuals; and generating an alert on a management user interface based on the sensor data of one or more of the individuals over the time interval via a communication channel that in communication with the sensor control system, wherein the management user interface provides a graphical representation of a suggested regrouping of one or more of the individuals at the worksite based on the coupling and interdependency relationship, thereby increasing the efficiency of current and future processes at the worksite.

15. The non-transitory computer readable medium of claim 14, wherein the sensor data is associated with metadata of a corresponding individual, corresponding jobsite, or typical processes.

16. The non-transitory computer readable medium of claim 14, wherein the sensor data comprises time stamp information provided by a local clock or time keeper on the one or more sensors.

17. The non-transitory computer readable medium of claim 14, wherein the sensor data is labeled with a categorical tag including an indication of a specific worksite activity that the individuals are capable of performing.

18. The non-transitory computer readable medium of claim 17, wherein the categorical tag includes an indication of a productive worksite activity or an unproductive worksite activity.

19. The non-transitory computer readable medium of claim 14, wherein the management user interface further provides a suggestion of an order of performing one or more worksite activities.

20. The system of claim 1, wherein the sensor data includes categorical tags of the worksite activities and wherein the categorical tags correspond to a productive label or an unproductive label.

* * * * *

UNITED STATES PATENT AND TRADEMARK OFFICE
CERTIFICATE OF CORRECTION

PATENT NO. : 10,679,307 B2
APPLICATION NO. : 14/971884
DATED : June 9, 2020
INVENTOR(S) : DeWalt et al.

It is certified that error appears in the above-identified patent and that said Letters Patent is hereby corrected as shown below:

Please delete Patent No. 10,679,307 B2 in its entirety and insert Patent No. 10,679,307 B2 in its entirety as shown on the attached pages.

Signed and Sealed this
Fifteenth Day of December, 2020

Andrei Iancu
*Director of the United States Patent and Trademark Office*

(12) United States Patent
DeWalt et al.

(10) Patent No.: US 10,679,307 B2
(45) Date of Patent: Jun. 9, 2020

(54) SYSTEMS AND METHODS FOR OPTIMIZING PROJECT EFFICIENCY

(71) Applicant: Rhumbix, Inc., San Francisco, CA (US)

(72) Inventors: Drew DeWalt, Orinda, CA (US); Zachary Scheel, San Francisco, CA (US); Michael Myers, San Leandro, CA (US); Alex Morisse, Oakland, CA (US)

(73) Assignee: RHUMBIX, INC., San Francisco, CA (US)

( * ) Notice: Subject to any disclaimer, the term of this patent is extended or adjusted under 35 U.S.C. 154(b) by 1113 days.

(21) Appl. No.: 14/971,884

(22) Filed: Dec. 16, 2015

(65) Prior Publication Data
US 2016/0171633 A1 Jun. 16, 2016

Related U.S. Application Data

(60) Provisional application No. 62/092,695, filed on Dec. 16, 2014.

(51) Int. Cl.
*G06Q 50/08* (2012.01)
*G06Q 10/06* (2012.01)

(52) U.S. Cl.
CPC ........ *G06Q 50/08* (2013.01); *G06Q 10/06398* (2013.01); *G06Q 10/063114* (2013.01)

(58) Field of Classification Search
USPC .............................................. 705/7.11–7.42
See application file for complete search history.

(56) References Cited

U.S. PATENT DOCUMENTS

| 5,930,741 A | 7/1999 | Kramer |
| 8,810,430 B2 | 8/2014 | Proud |
| 2002/0072960 A1* | 6/2002 | Dabbiere ............... G06Q 10/08 705/28 |
| 2006/0193262 A1* | 8/2006 | McSheffrey ........... H04Q 9/00 370/241 |
| 2009/0204471 A1 | 8/2009 | Elenbaas et al. |

(Continued)

FOREIGN PATENT DOCUMENTS

WO WO-2016100554 6/2016

OTHER PUBLICATIONS

Teizer, Jochen, "Location tracking and data visualization technology to advance construction ironworkers' education and training in safety and productivity", School of Civil and Environmental Engineering, Georgia Institute of Technology, Automation in Construction vol. 35, pp. 53-68, Apr. 2013 (Year: 2013).*

(Continued)

*Primary Examiner* — Amber A Misiaszek
(74) *Attorney, Agent, or Firm* — Wilson Sonsini Goodrich & Rosati

(57) ABSTRACT

Systems and methods of monitoring actions performed by one or more workers on a jobsite are provided herein. The actions can be monitored over time and tagged as worked and unworked time intervals. Interactions between individuals and teams of individuals can be monitored. Efficient processes can be determined for use in current and future projects to maximize efficiency and reduce costs associated with the current and future projects.

20 Claims, 7 Drawing Sheets

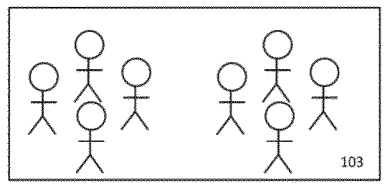
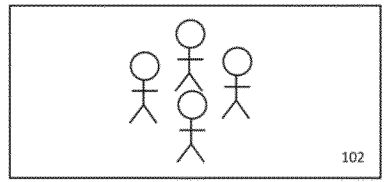
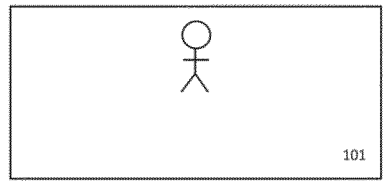

SYSTEMS AND METHODS FOR OPTIMIZING PROJECT EFFICIENCY

CROSS REFERENCE

This application claims the benefit of U.S. Provisional Application No. 62/092,695, filed Dec. 16, 2014, which application is incorporated herein by reference.

BACKGROUND

Construction projects can comprise a plurality of individuals with different specialized skills performing tasks to complete the construction project. The individuals can work on specialized teams, and the specialized teams can interact in both constructive and destructive ways. In some cases, teams or individuals can share space or equipment while performing different tasks on a work site.

SUMMARY

Projects that involve one or more groups of individuals can have sources of inefficiency that may not be obvious to a manager of the one or more groups. Monitoring and analysis of tasks performed by individuals in the group and/or the group as a whole can identify sources of inefficiency that may not be otherwise detectable by the manager. Interactions between different groups working in a space or on a project can be identified from data obtained by monitoring the tasks performed by individuals in the group and of the groups themselves. In some cases, one or more projects can comprise a series of tasks. Data obtained by monitoring the tasks performed by individuals in the group can identify the best way in which to complete individual tasks and which order the tasks should be performed to increase or maximize efficiency of the project.

Provided herein are systems and methods for improving or optimizing efficiency of projects, for example construction projects. The systems and methods analyze data from one or more sensors to identify efficient processes, crew-based metrics, and efficient working relationships between one or more workers and one or more groups. Sensor data can be collected from wearable sensors worn by workers performing tasks to complete the project. The sensor data can be stored and analyzed by a computer system. One or more project managers can monitor and view the sensor data in real-time. Historic sensor data can be used for future or current project management and planning.

An aspect of the invention is directed to a method of monitoring one or more individuals performing one or more processes, the method comprising: collecting sensor data from some of the one or more individuals over a time interval; determining a productive fraction of the time interval the one or more individuals were engaged in a productive task based on the sensor data; calculating, with aid of one or more processors, an efficiency for the one or more individuals as a comparison of the fraction of the time interval to the time interval; and analyzing, with aid of one or more processors, the efficiency calculation to increase efficiency of current and future processes.

Further aspects of the invention provide a non-transitory computer readable medium comprising machine executable code that, upon execution by one or more computer processors, implements a method of monitoring one or more individuals performing one or more processes, the method comprising: collecting sensor data from some of the one or more individuals over a time interval; determining a productive fraction of the time interval the one or more individuals were engaged in a productive task based on the sensor data; calculating, with aid of one or more processors, an efficiency for the one or more individuals as a comparison of the fraction of the time interval to the time interval; and analyzing, with aid of one or more processors, the efficiency calculation to increase efficiency of current and future processes.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

FIG. 1 shows different levels of analysis that can be performed including individual, group, and group to group interaction.

FIG. 2 shows a group of individuals wearing electronic devices with sensors communicating with a computer system.

FIG. 3 shows a possible work flow from a worker's electronic device sensors tagged as productive and unproductive tasks as well as specific work motions to complete such tasks.

FIG. 4 shows a flow chart of data from one or more sensors to a user device through a computer system.

FIG. 5 shows an example of a display that can be provided by a user interface to an individual.

FIG. 6 shows different process orders that can be analyzed to determine a process with optimal efficiency.

FIG. 7 schematically illustrates a computer system for facilitating analysis of data to generate worksite optimization metrics.

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Efficiency management systems can comprise one or more groups of individuals that are performing one or more tasks. The systems can comprise interdependencies between the individuals and/or groups of individuals that cannot be observed by a manager. Specific individuals performing the tasks can have different skill sets, and the interaction of the individuals with varying skill sets can influence performance efficiency. Furthermore, when more than one group occupies a space to perform a plurality of tasks, chaotic flows of people and materials can exist that can be unobvious to predict or efficiently manage in real time. Provided herein are systems and methods to monitor motion and activities of individuals performing tasks in an environment. The motion monitoring can be analyzed to optimize efficiency of current and/or future tasks in the environment.

In some cases, the environment can be a construction site and the individuals can be construction workers performing construction tasks. A construction site (e.g., job site or worksite) can be a location where a building, infrastructure component, or object is being built or demolished. A construction site can comprise electrical, fluid, and structural components that can be connected or disconnected to form or demolish a building, infrastructure component, or object. One or more teams of skilled workers can complete tasks concurrently or consecutively on the construction site. The construction workers can connect components to erect a structure, for example, a building, bridge, or other free standing structure. The construction workers can produce infrastructure, for example, roads, power lines, natural gas pipelines, or plumbing lines. The construction workers can connect materials, install materials, or remove materials to at least partially complete a construction project. In some cases the construction worker can operate specialized and/or power machinery to perform a construction task. For example, such machinery can include a crane, bulldozer, backhoe, forklift, or power tools. The teams of skilled workers can be managed by a contractor, subcontractor, manager, superintendent, crew chief or foreman. In some cases, the workers can perform tasks that are physically strenuous and/or dangerous.

Provided herein are systems and methods for monitoring and optimizing work flow efficiency of one or more work teams on a jobsite. The outputs from the monitoring and optimization can be used by managers to assign tasks, build teams, organize process flows, monitor completion, review work completed, review safety incidents, and make projections for future projects. The work flow can be monitored by collection and analysis of data generated by one or more sensors worn by workers at the jobsite. The work flow can be monitored at one or more levels. FIG. 1 shows a diagram depicting the different levels at which the work flow can be monitored. In some cases, the work of a single individual 101 can be monitored. One or more individuals can be monitored concurrently. In some cases, a team of workers 102 can be monitored. A team of workers can be one or more individuals that complete a series of one or more tasks to complete a job. A work team can comprise a set of individuals with related skills or a set of individual with complementary skills. For example, a work team can be a group of electricians, plumbers, builders, or a diverse group of worker with different skill sets. A work team can be a group of individuals managed by a single contractor or foreman. The work flow of an entire team of workers can be monitored and each worker can be anonymous such that the work of an individual worker on the work team is not distinguishable from another individual on the work team. Alternatively work of different individuals on the work team can be transparent and individually identifiable. In some cases, work flow between one or more work teams 103 can be recorded and analyzed. The one or more work teams can work on different aspects of one project. The team can work at a particular location or region of the worksite or on a particular task or sub-project. The different aspects of the project can be complementary aspects of a single project or a plurality of projects.

Each worker in a work team can generate a sensor data stream in real time. The sensor data stream can be generated from one or more sensors worn by the worker. The sensors can be provided on a wearable electronic device. A wearable electronic device can be a bracelet, watch, arm band, strap, necklace, glasses, hat, hardhat, safety vest, wrist band, ankle band, shoe or boot, socks, chest band, shirt, pants, head band, leg band, skin patch, earbud, or imbedded in the skin of a worker. Alternatively, the wearable electronic device can be a device sized and configured to be placed in a pocket or pouch on a piece of clothing worn by a worker. In some cases, the wearable electronic device can be a smartphone, pager, or tablet.

The worker can wear one or more sensors while working. The wearable electronic device can comprise sensors configured to detect movement, motion and/or location of a worker while performing a task. In some cases, a worker can wear one or more sensors on two or more body parts. The sensor data can be combined from the sensors on the two or more body parts to increase accuracy when analyzing movement, motion, and/or location of the worker. For instance, a combination of movements of the sensors may be assessed to determine an activity of a worker. In some instances, the activity of the worker may be determined based on a comparison with likely activities to be performed by the worker. A combination of movements or locations of the sensors may be assessed to determine a physical position or motion being made by the worker. The data from the sensors may be checked for any discrepancies and/or may raise any alerts. For instance if a sensor worn by an arm of a worker is in a first room and a sensor worn by a leg of the worker is in another room, there may be some indication of error or that the worker is not wearing the sensors. The wearable electronic device can also comprise sensors configured to detect ambient environmental conditions and/or biometric individual body information. Any description of sensors may apply to any type of sensor. For instance, any description of sensors used to analyze movement motion, and/or location of the worker may apply to sensors configured to detect environmental conditions and/or biometric individual body information. For instance, a first sensor worn by a worker may be used to detect movement of the worker while a second sensor worn by the worker may be used to detect a biometric or physiological condition of the worker. Data from any combination of sensors may be analyzed alone or in conjunction. Data from any combination of sensors may be used to determine a state of the worker, an activity of the worker, a location of the worker, safety considerations associated with the worker, working conditions of the worker, health status of the worker, or any other information associated with the worker.

The one or more sensors can include motion sensors. Motion sensors can comprise an accelerometer, a gyroscope, a pedometer, infra-red (IR) sensor, ultrasonic sensor, LIDAR, visual sensor, magnetometer, and/or any other inertial motion sensors. The sensors can be used to assess a position (e.g., orientation and/or spatial location), or motion (e.g., linear velocity, angular velocity, linear acceleration, angular acceleration) or a worker, or a body part of the worker. The one or more sensors can include location sensors, for example global positioning sensors (GPS) and wireless local area network (WLAN) location sensing. The one or more sensors can include body monitoring sensors to measure physiological parameters, for example a heart rate monitor, blood pressure sensor, sweat monitor, blood composition monitor and/or thermometer. The one or more sensors can include ambient conditions sensors to measure environmental parameters, for example a temperature, humidity, and barometric pressure.

The data stream can comprise a time history corresponding to a time that each data point in the data stream is generated. The data stream can comprise location and movement data collected by one or more sensors worn by each worker. FIG. 2 shows a group of workers 200 wearing electronic devices 201. The electronic devices 201 can transmit sensor data to a computer system 202. The electronic devices 201 can transmit sensor data to a computer system continuously, at discrete intervals, and/or whenever movement is detected by one or more of the sensors. In some cases the sensors can transmit data to the computer system when they are within a predetermined area, the area can be defined by a geofence or a geographic radius about a point. The area can have any shape. The sensors may or may not transmit data when outside the predetermined area. In some cases the predetermined area can comprise the worksite. The worksite can have internal geofences that define different task or workforce regions. For example, a region on the worksite can be labeled as an active or inactive work area. In some cases, different regions of the worksite can be labeled with different work teams, for example a construction area or a demolition area. In other cases, different regions of the worksite can be labeled with different work zones associated with building elements, for example grade beam or retaining wall. In still other cases, different regions of the worksite can be labeled with different work processes, for example trenching or placing concrete. The sensors may transmit information when within selected work areas. The sensors may or may not transmit information when outside selected work areas.

The sensor data can correspond to work site activities. A movement detected by the one or more sensors can correspond to a specific action. An action can be movement of a body part or parts of the worker to which the sensors are attached. The sensor data can describe the direction, speed, and/or acceleration with which a body part is moved to perform an action. The sensor data can describe the action as a repeated or single action. The sensor data can detect translation and rotation of a body part. In some cases, the sensor data can indicate that a worker is holding or operating a tool or machine while performing the action. For example, a movement detected by the one or more sensors can indicate swinging of a hammer or moving of a material. The movement or action may be correlated with one or more tasks to be performed by the worker.

In some instances, the sensor data may be correlated with information stored in memory, that may be indicative of an action or task being performed by a worker. For instance, a library or database may be provided storing information about how sensor data may be interpreted. The correlation may depend on one or more physical characteristic of the user or demographics of the worker. In some instances, the correlation may depend on prior data collected for the worker. For instance, calibration steps may occur. In one example, data of a known action of a worker (e.g., swinging of a hammer) may be recorded and/or analyzed. Future actions of the worker may be compared with the known actions of the worker.

Data from the sensors that are not movement sensors can be combined with the movement sensor data to assign an action to the movement sensor data or be used on its own. For example, movement data can correspond to picking up an object and data from a heart rate sensor can indicate that the heart rate of the worker increased above a threshold value while performing the movement. The elevated heart rate can indicate that the object was heavy. Similarly, geolocation data can be used to determine the location of the worker in the context of the worksite. A map of the worksite can be known from a building plan, a blueprint for the worksite, or an electronic building information model (BIM) for example. Data from one or more location sensors on the electronic device can be used to determine the location of the worker in the worksite relative to the known worksite map or the geography in general. In an example, movement data can correspond to picking up an object and data from a location sensor can indicate that the worker was near a pile of steel bars on the worksite. The detected proximity to steel bars can indicate that the object picked up by the worker was a steel bar.

Additionally, the one or more sensors can provide a time stamp for each movement and/or location data point. The time stamp can be provided by a local clock or time keeper on the electronic device. Alternatively a computer system that receives sensor data from the electronic device can have a clock that can assign a time stamp to the sensor data. The time stamp can be used to determine when specifically an action begins and ends and for how long an action is performed. The time stamp can be combined with the motion and location data to determine how long a worker spends performing productive and unproductive activities as well as specific and non-specific activities.

The one or more wearable sensors can communicate sensor data to a processor programmed to determine if the sensor data indicates worked or non-worked actions and specific or non-specific activities. Data can be collected by the one or more sensors at a rate of at least about 1 hertz (Hz), 5 Hz, 10 Hz, 15 Hz, 16 Hz, 17 Hz, 18 Hz, 19 Hz, 20 Hz, 30 Hz, 40 Hz, 50 Hz, 60 Hz, 70 Hz, 80 Hz, 90 Hz, or 100 Hz. In some cases, one or more sensors can collect data at substantially the same rate. Alternatively, one or more sensors can collect data at different rates.

Each sensor or group of sensors can be associated with a set of metadata. The metadata can be specific to a worker wearing the sensor or group of sensors. The metadata can include personal information about a worker, information about the jobsite, and/or general data about typical work activities. The metadata can comprise worker identification, age, gender, weight, handedness, cardiac health, general health history, averages resting heart rate, typical work activities, typical tools used during work, weight of tools used, number of tools used to perform a typical job task, geographic layout of worksite, functional layout of work site, weather conditions, and/or company data.

A data stream generated by a worker can comprise a one or more time stamps, locations, and/or movements sensed by one or more motion sensors. The sensor data can be transmitted to a computer system comprising one or more processors programmed to interpret and/or label the sensor data. The one or more processors can determine that the sensor data corresponds to one or more motions. The sensor data can be labeled with one or more semantic or categorical tags. The sensor data can be labeled as "productive activity" or "unproductive activity". In some cases, the sensor data can be labeled with a more specific task label such as "direct" or "indirect" or "contributory" or "non-contributory." In some cases, the sensor data can be labeled with a specific task, a specific task can be a task performed on the job site. For example, a specific task can be "support tying rebar", "laying pipes", "pouring concrete", "cutting sheet metal", "transporting building materials", "welding", "digging", "grading", "drilling", "hammering", "sawing", "framing", "installing electrical bulks", "installing drywall", "site preparation", "material handling", "reporting", and "cleanup".

In some cases, the one or more processors can assign a probability to a label. The probability can reflect the likelihood that the motion data corresponds to the labeled activity. The probability may be expressed as a percentage or ratio, numerical score, or may fall into one or more qualitative category (e.g., "high", "medium", "low"). In some instances, only a single label and probability may be assigned. Alternatively, multiple possible labels with varying probabilities may be assigned. For example, it may be determined that a motion of a worker is likely 80% that he is swinging a hammer, 15% that he is shaking an object, or 5% that he is removing dust.

Location data and metadata associated with a specific worker can contribute to the assigned probability. For example, if a motion is labeled "laying pipes" the probability that this tag is correct can be higher for a worker on a plumbing team than for a worker on an electrical team. Similarly, if a motion is labeled "laying pipes" the probability that this tag is correct can be higher when the motions is detected near a location where a blueprint or building plan indicates piping should be installed and lower when the motion is detected far from a location where a blueprint or building plan indicates piping should be installed. Similarly, the motion duration can contribute the probability. For example, if an action is labeled "laying pipes" occurs over a given time interval, the probability that this label is correct can be influenced by whether this time interval is within a predetermined time interval that is typically associated with how long it should take a worker or workers to lay pipes.

The sensor data can be used to calculate worked and unworked time. The sensor data can be tracked in real time as it is acquired. When the one or more sensors detect an action associated with a work activity the duration of the work activity can be monitored and recorded as worked time. Similarly, when the one or more sensors detect an action associated with a non-work activity the duration of the non-work activity can be monitored and recorded as unworked time. Work activities can be any activities that contribute to productivity in completing a specified task. In some cases work activities can comprise site preparation, material handling, tool servicing, equipment servicing, and/or materials installation. Work activities can be specific to a task or industry. Non-work activities can be any activities that do not contribute to productivity in completing a specified task. In some cases non-work activities can comprise rest, unnecessary travel, wait time, and/or time spent on personal tasks. In some cases, non-worked activities can be detected during a time period that work activities are expected to occur based on a predetermined input. When a non-worked activity occurs for a duration of time above a predetermined threshold, a delay can be recorded. The delay can be reported to a manager and/or a client. An efficiency can be calculated for a single worker or a group of workers based on the ratio of worked time to total time, total time can comprise the total time a worker spend on the jobsite or the total time that a worker logs on a time card. Efficiency can be calculated from the following equation, $$\text{Efficiency} = \frac{\text{Hours worked}}{\text{Total Hours}}.$$

FIG. 3 shows an example of a data stream 300 that can be generated from sensors on an electronic device worn by a worker 301. The worker can generate sensor data that can be labeled with specific task tags. The task tags can correspond to productive (e.g., work) and unproductive (e.g., non-work) activities. Each task tag can have a time stamp that described the start and end of the task such that a time duration can be assigned to the task tag. The worker can perform tasks 302, 304, and 305. These tasks can be labeled with tags that correspond to productive activities 306. In some cases, productive activities can be activities that contribute to completion of a project. The worker can perform a task 303 that can be labeled as unproductive 307. Unproductive activities can be rest, waiting, meal time, travel or any other activities that do not contribute to completion of a project.

The data stream can be collected and stored for one or more workers and/or one or more work teams. The data stream can be stored on a memory storage device on the wearable electronic device and/or on a memory storage device on an off-board computer system. In some cases the off-board computer system can be a cloud computer system or one or more servers. The data stream can comprise total worked time and unworked time. The worked and unworked time can be stored for each individual worker. The worked and unworked time can be compiled and stored for a team of workers without identifying an individual worker or with identifying workers individually. The total worked time can be analyzed with a productivity measure to determine the efficiency of a worker and/or work team. A productivity measure can be quantified in a standard unit for a specific task. For example, a productivity measure can be linear feet of wire installed, linear feet of piping installed, cubic yards of concrete placed, or tons of structural steel erected in a build structure. Using the sensor data a worker's or group of worker's time spent on a jobsite can be broken up into productive hours and unproductive hours. The productivity for a given time period on the worksite can be calculated as shown below, $$\text{Productivity} = \frac{\text{Quantities Output}}{\text{Productive Job Hours Input}},$$

where the productive job hours input is derived from the sensor data and the quantities output is a productivity measure. In some cases, the sensor system and analysis can also determine quantities output. In some cases, one or more clients can be charged only for the productive job hours.

The data collected from the one or more sensors can be collected and analyzed to determine efficient and inefficient workflow scenarios. Efficiency can be calculated as defined above for a single worker, a group of workers, a team of workers, and/or a job site comprising a plurality of teams of workers. In some cases, further analysis can be performed to identify coupling and interdependencies between one or more single workers, one or more groups of workers, and/or one or more teams of workers. The efficiency data can be stored on a memory storage device on the computer system.

The efficiency data can be used and shared between different projects to increase efficiency in future or current projects.

In some cases, a sensor can be in communication with a computer system as shown in FIG. 4. Data from one or more sensors 401 can be transmitted to a computer system 402. The computer system can be a central computer system configured to receive, analyze, and/or store sensor data from one or more workers. The computer system can be a single computer (e.g., server), a cloud computing system (e.g., a plurality of computers or servers). The computer system can be further configured to transmit raw and/or processed sensor data to one or more user devices 403. A user device can be an electronic device in communication with the computer system. A user device 403 can comprise a display, for example, a screen. The display can show a user interface. FIG. 5 shows an example of a user interface 500 that can be provided on by the display. The user interface can show graphical efficiency 501 of one or more workers or teams of workers in real time and/or historically. The user interface can display a meter 502 showing a percentage of a project that has been completed in real time, in some cases the percentage of the project completed can be shown compared to an estimate or quoted time duration. The percentage of a project that has been completed can also be provided numerically 503 on the user interface. A user can receive alerts on the user interface, in some cases the alerts can be textual alerts indicating a delay or drop of efficiency below a predetermined threshold. The user interface can display the location of one or more workers on a map. The map can comprise labels of different geofence regions on the construction site.

In some instances, a user device 403 can be a smartphone, tablet, wearable device, laptop, and/or desktop computer. A jobsite manager can monitor historical and real-time worker efficiency through a program executed on the user interface on the user device via an app or software browser. The user device can alert a jobsite manager of efficient processes, inefficient processes, and ways to increase jobsite efficiency. The program executed on the user device can be compatible with other project management and scheduling tools (e.g., HCSS Construction Software, CMiC Construction Software, eSUB Construction Software, Timberline).

In some cases, a jobsite can have two or more managers that provided oversight to two or more teams working on the jobsite. The two or managers can monitor both the actions and progress of their team as well as the actions and progress of other teams on the jobsite through the user device or separate user devices 403. Using the information about the actions and progress of other teams on the jobsite a manager can develop a strategy for their team that will optimize productivity of their team. For example, a manager can be alerted through a user device that another team on the jobsite is behind schedule on a project. As a result of the other team being behind schedule the manager can update the schedule of their team to avoid conflict or decreased productivity. The user device can be configured to provide a communication channel between managers. In some cases, managers can communicate that help is needed or that a hazard has been detected. The user device can alert a manager with a push notification when a delay, project completion, or danger is detected. The user device can alert managers of near-miss incidents with a push notification. Additionally, the user device can send a push notification from environmental health and safety officials.

The computer system can provide analysis of the sensor data to the user device comprising a user interface that can be in communication with the computer system. The user interface can show raw or processed sensor data from one or more sensors worn by one or more workers in real time. Additionally, the user interface can show a time history of raw or processed data for a given worker or group of workers in a specified time interval. The specified time interval can be a user defined time interval or a preset default. In some instances, the user interface can suggest procedures to maximize efficiency on the work site. The procedures can be based on historical data for a specific worksite or the procedures can be based on pooled historical data from multiple worksites. Historical data from worksites with similar goals and/or conditions can be pooled to determine procedures to maximize efficiency in analogous worksites or in analogous tasks and task groupings. The user interface can suggest process ordering, worker tasking, worker grouping, or inter-worker coordination. For example, a worksite building a bridge can receive suggestions based on data from other historical bridge construction projects that occurred in areas with similar environmental conditions. The computer system can also send alerts to a construction manager when efficiency on the work site falls below a predetermined threshold. In some cases, the computer system can send alerts to the construction manager when a sequence of processes is expected (e.g., has a probability above a predetermined threshold) to cause an inefficiency on the construction site.

The computer system can compile data from one or more construction sites to enhance efficiency analysis. The computer system can match historic sensor data from previous work scenarios with current or future work site to propose or suggest work conditions that will optimize efficiency of the current or future work site. For example, historic sensor data can suggest that efficiency is increased when a first group of specialized workers (e.g., demolition, electrician, or plumber) start work on a project a specified time interval after a second group of specialized workers based on historical sensor data.

Sensor data pertaining to an individual worker can be monitored. The ability to monitor individual workers can increase transparency on a worksite. Sensor data for each worker can be used to verify time-card reporting or replace conventional time cards. A manager can remotely access real-time and/or historical sensor data for a worker through a user device. In some cases, workers can be incentivized to work harder or more consistently because a manager can monitor their work output at any time. Similarly, worker morale and health can be monitored historically and/or in real time. A manager can determine morale and health of workers from the sensor data collected in real-time and/or historical data. Based on the sensor data a manager can design a work schedule for one or more workers to optimize efficiency of a single worker or group of workers. Based on the sensor data, a manager can determine how many hours a worker should work, how often a worker should have a break, and what type of work a worker should perform to optimize jobsite productivity. Such determinations could be made on a day-to-day basis based on the changing personal conditions of individual workers. The user interface can display to a manager values such as efficiency and/or productivity or one or more workers over time. For example, the sensor data can indicate to a manager that efficiency or a worker or team of workers decreases below a predetermined threshold after 4 pm. Based on this information, a manager can choose to end the work day at 4 pm in order eliminate low efficiency work hours.

Interdependencies between workers can be identified by data collected from one or more sensors. Efficiency of a worker can be monitored over time. Location proximity to other workers can be similarly recorded and monitored over time. In some cases, worker efficiency and proximity to other workers can be analyzed to determine which workers work well (e.g., efficiently) together and which workers work poorly (e.g., inefficiently) together. Based on the analysis of worker-worker efficiency a manager can create teams that will work most efficiently together.

In some instances, a jobsite can comprise a first work team and a second work team. The first and second work team can work different projects on the same jobsite. The different projects can be isolated from each other. In some cases, the different projects can be coupled. In an example, a first work team can work on a project that cannot be started until a second team starts their project. In some cases, a first work team and a second work team can share materials or equipment such that they cannot work on the same aspects of different projects concurrently. A first team's project and a second team's project can require the same physical space such that the first team and the second team cannot work at the same time. Coupling between projects of the first work team and projects of the second work team can be unobvious. Coupling between projects of the first work team and projects of the second work team can result in chaotic work flows. The data collected from one or more sensors can be processed to identify favorable and unfavorable coupling between work teams. The data can be analyzed to identify sequences of projects and interactions between the one or more work teams that maximize productivity.

Additionally, process efficiency can be maximized by ordering processes, specific tasks or individual motions within a work team or between work teams to maximize efficiency. The system can calculate with the aid of one or more processors connections between process order and efficiency. The user device can display different orders of processes with corresponding predicted efficiency levels as calculated by the one or more processors. Suggestions can be provided to a user based on the calculation to maximize efficiency, productivity, and/or to minimize time needed to complete the process. Historical sensor data from one or more work sites can be analyzed to determine an ordering of one or more processes that will increase efficiency. FIG. 6 shows an example of a series of process flows that can be analyzed to achieve an optimal order that maximizes productivity and/or efficiency. In a first ordering 600*a*, action 601 can be followed by action 602 to achieve a result 603. In a second ordering 600*b*, action 602 can be followed by action 601 to achieve a result 603. The efficiency of each ordering can be analyzed to determine the ordering that results in higher efficiency. For example, a job on a work site can comprise cutting sheet metal and moving the sheet metal from a first location to a second location. In a first scenario, a team of workers can cut a piece of sheet metal and then move the sheet metal from the first location to the second location. The team of workers can repeat the process of cutting and then moving until all of the sheet metal is cut to the desired size and moved to the second location. The efficiency of the process order described in the first scenario can be recorded. In a second scenario all of the sheet metal can be cut to a desired size and then all of the sheet metal can be moved from the first location to the second location. The efficiency of the process order described in the second scenario can be recorded. The efficiency of the process described in the first scenario and the efficiency of the process described in the second scenario can be compared to determine which process order results in a higher efficiency process. Future jobs can be designed such that they follow the process order with higher determined efficiency.

The one or more sensors can communicate sensor data to a computer system. The computer system can be on-board a wearable device comprising the one or more sensors. Alternatively, the computer system can be off-board the wearable device. In some cases, the one or more sensors can communicate the sensor data to a cloud computing system. The cloud computing system can comprise one or more processors programmed to analyze the data from the one or more sensors. The sensor data can be used to generate a time history of movement and/or vital information from a worker. The sensor data can be generated by productive and unproductive actions performed by the worker. The one or more computer processors can be programmed to label the actions as productive or unproductive.

The sensor data may be sent to the computer system via a wired or wireless communication. The sensor data may be sent to the computer system in real-time, at periodic intervals, or in the event of a detected event.

In some instances, the one or more processors can be programmed to perform a model analysis to determine whether the sensor data corresponds to productive or unproductive actions. The model can be a statistical model. In some cases the model can calculate a confidence interval (e.g., probability) associated with the productive or unproductive label, the confidence interval can indicate the probability that the action has been labeled correctly. The label can be semantic or categorical tag. The label can be a binary label such as productive or unproductive. Alternatively, the label can correspond to a specific work task. In some cases, the labels can be chosen from a bank of labels that are stored in a memory storage device in the computer system. In some cases, a Bayesian model can be used to label the actions. The Bayesian model can be a Bayesian Hierarchical model (BHM). The BHM can be used to calculate a confidence interval for a label at any level on the work site. For example, the BHM can calculate a confidence interval for a label of actions performed by an individual worker, a team or workers, or a group of teams of workers.

The one or more processors can be programmed to identify an action based on one or more data points from the one or more sensors. The correlation between the action and the one or more data points can be predetermined. Additionally, the processors can be configured to execute a machine learning algorithm to learn new actions and/or to adjust to variance in the motion of specific individuals. For example, an individual can move faster or slower with respect to a predetermined movement for the action, over time the machine learning algorithm can adjust to the faster or slower pace of the individual. In another case, an individual can move more or less with respect to a predetermined movement when performing the action. With repeated uses, the one or more processors can adapt to the motions of a specific user and can more accurately label actions performed by the specific user.

The one or more processors can be programmed to execute a model with two layers. The first layer can extract semantic and/or categorical tags that label the sensor data. One or more distributions can be chosen to represent the sensor data. The distributions can correspond to the probability assigned to each of the labels. The second layer of the model can determine optimal processes, schedules, and/or worker groupings that can optimize efficiency on a project. The model can determine dependencies at small (e.g., worker to worker), intermediate (e.g., within a team), or large (e.g., team to team) scales on the worksite.

They model can have information about the worksite layout and the placement of physical and functional features. In some cases, the model can be integrated with one or more building information modeling (BIM) programs. The BIM can provide the model with information about site specific metrics such as the location of physical features and characteristics at a worksite. Additionally the BIM can have a time domain component that can update in-real time with progress on the worksite. As structures are created or destroyed in the real work site, the structures can be created or destroyed in the BIM. Similarly, materials can appear in the BIM when they are delivered to the work site. Integration of the model and the BIM can allow application of productivity metrics to a specific site such as mass flow, turbulence, and/or optimal process ordering. In some cases, dynamic genetic programming can be used to determine functional dependencies between groups of sensor data.

The model can process the sensor data using signal processing techniques to derive information from the sensor data. In some cases, a Fast Fourier Transform (FFT) can be applied to the sensor data to identify differences between similar motion patterns between one or more workers or between motion patterns from the same worker at different time periods. Each worker can generate a unique FFT analysis while performing a task, the FFT analysis can be used to distinguish motion data from different workers. Alternatively, the FFT analysis can be used to determine worker fatigue. Changes in the FFT analysis of a signal from a worker over time can indicate fine changes in the motion of the worker that can indicate fatigue or overuse of a joint or muscle group.

Differences in the skill level or ability between different workers can be detected by analysis of the sensor data. Suggestions can be provided to managers based on the analysis to assign workers to different types of tasks where they can be used most efficiently. For example, when two workers perform an identical task differences in the efficiency between a first worker performing the task and a second worker performing the task can be identified. In some cases, workers can have different levels of strength, fine motor skills, coordination, cognitive ability, stamina, and/or patience. Differences in ability can increase the efficiency with which a worker can complete a specific task. The sensor data can be analyzed to determine that a first worker with a first set of skills or ability level is more efficient at completing a first set of tasks while a second worker with a second set of skills or ability level is more efficient at completing a second set of tasks. Based on the sensor data workers can be assigned to tasks that they can complete most efficiently and can be unassigned from tasks that they complete less efficiently compared to other workers. For example, a relatively stronger worker can haul heavy building material without taking breaks while a relatively weaker worker can require periodic rest breaks while hauling the heavy building material. The sensor data can show that the relatively stronger worker is able to work more efficiently while hauling the heavy building material compared to the weaker worker. As a result, the stronger worker can be assigned to the tasks that require hauling heavy materials while the weaker worker is assigned to a different task or set of tasks.

The one or more processors can be further programmed to determine one or more action sequences that can optimize efficiency of the work site. An efficiency can be determined for each individual worker at a work site. The efficiency data for each worker can be analyzed relative to other workers to identify worker to worker interactions and dependencies. For example, worker A can have a first efficiency while completing a task with worker B and a second efficiency while completing the same task with worker C. If the first efficiency is greater than the second efficiency the data can indicate that worker A should work with worker B instead of with worker C in order to increase efficiency.

Additionally, the data from the one or more sensors can be interpreted by a model executed by the one or more processors to determine the optimal number of workers that should be assigned to a task in order to optimize costs and task efficiency. Optimization can decrease costs and increase productivity. In some instances, a group of workers can be assigned to a task. More than one worker can be assigned to the task, for example, at least about 2, 3, 4, 5, 6, 7, 8, 9, or 10 workers can be assigned to work collaboratively on a single task. The sensor data can be analyzed to determine if the group of workers is being efficient at performing the task. The sensor data can be analyzed to determine the optimal number of workers assigned to the task. For example, if a group of workers are assigned to the task and the sensor data indicates that at least a fraction of the workers are logging unworked time as indicated by the sensors data while the remaining fraction of workers are logging worked the sensor data can indicate that too many workers have been assigned to the task.

At a higher level, the efficiency of an entire crew of workers can be analyzed with respect to interactions with a second crew of workers. For example, a worksite can have a first group of workers completing a first task and a second task. The first and second task can be coupled such that they share equipment, space, and/or resources. The one or more processors can be programmed to determine a sequence of actions by the first and second crews that will maximize work site efficiency.

Control Systems

The present disclosure provides computer control systems that are programmed to implement methods of the disclosure. FIG. 7 shows a computer system 701 that is programmed or otherwise configured to collect and analyze sensor data collected from one or more individuals. The sensor data can comprise data pertaining to an individual's location and movement. The sensor data can be collected by one or more sensors worn by the individual. The computer system 701 can determine the work efficiency of an individual based on the sensor data. The computer system 701 can identify processes that result in optimal or increased efficiency and cost savings at a worksite. The computer system 701 can further identify optimal coupling between individual workers or groups of workers.

The computer system 701 includes a central processing unit (CPU, also "processor" and "computer processor" herein) 705, which can be a single core or multi core processor, or a plurality of processors for parallel processing. The computer system 701 also includes memory or memory location 710 (e.g., random-access memory, read-only memory, flash memory), electronic storage unit 715 (e.g., hard disk), communication interface 720 (e.g., network adapter) for communicating with one or more other systems, and peripheral devices 725, such as cache, other memory, data storage and/or electronic display adapters. The memory 710, storage unit 715, interface 720 and peripheral devices 725 are in communication with the CPU 705 through a communication bus (solid lines), such as a motherboard. The storage unit 715 can be a data storage unit (or data repository) for storing data. The computer system 701 can be operatively coupled to a computer network ("network") 730 with the aid of the communication interface 720. The